US009594986B2

(12) United States Patent
Ebisawa

(10) Patent No.: US 9,594,986 B2
(45) Date of Patent: Mar. 14, 2017

(54) INKJET PRINTER CORRECTING IMAGE DATA BASED ON CALCULATED INKJET HEAD DISPLACEMENT AND INTER-PIXEL DISTANCES

(71) Applicant: RISO KAGAKU CORPORATION, Tokyo (JP)

(72) Inventor: Takashi Ebisawa, Ibaraki (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/050,778

(22) Filed: Feb. 23, 2016

(65) Prior Publication Data

US 2016/0288555 A1    Oct. 6, 2016

(30) Foreign Application Priority Data

Mar. 31, 2015  (JP) .................................. 2015-071371

(51) Int. Cl.
*G06K 15/10* (2006.01)
*H04N 1/00* (2006.01)
(Continued)

(52) U.S. Cl.
CPC .............. *G06K 15/027* (2013.01); *B41J 2/01* (2013.01); *B41J 2/155* (2013.01); *B41J 2/16579* (2013.01);
(Continued)

(58) Field of Classification Search
None
See application file for complete search history.

(56) References Cited

U.S. PATENT DOCUMENTS 6,843,610 B2 * 1/2005 Ioka ..................... B41J 2/2135
358/1.9
8,517,490 B2 * 8/2013 Kanematsu ............ B41J 2/2135
347/12
(Continued)

FOREIGN PATENT DOCUMENTS

JP    2004-154950    6/2004
JP    2011-73185     4/2011
(Continued)

OTHER PUBLICATIONS

Partial European Search Report for EP 16159347.0 having a mailing date of Aug. 18, 2016.

*Primary Examiner* — Scott A Rogers
(74) *Attorney, Agent, or Firm* — Greenblum & Bernstein, P.L.C.

(57) ABSTRACT

There is provided a distance calculator configured to calculate an amount of displacement of an inkjet head in the main scanning direction, and an inter-pixel distance between neighboring pixels adjacent in the main scanning direction, based on read-in test pattern image data (test image data) read from an original subjected to printing based on test pattern image data printed by discharging from a plurality of nozzles, and an image processor configured to correct image data included in a received print job so as to increase, in accordance with the amount of displacement, the amount of ink to be discharged from nozzles corresponding to positive correction target pixels whose calculated inter-pixel distance exceeds an inter-pixel threshold value (a predetermined distance).

3 Claims, 16 Drawing Sheets

(51) Int. Cl.

| | |
|---|---|
| *H04N 1/401* | (2006.01) |
| *H04N 1/409* | (2006.01) |
| *B41J 2/155* | (2006.01) |
| *B41J 2/21* | (2006.01) |
| *B41J 2/205* | (2006.01) |
| *B41J 2/165* | (2006.01) |
| *B41J 2/01* | (2006.01) |
| *B41J 29/393* | (2006.01) |
| *G06K 15/02* | (2006.01) |
| *H04N 1/40* | (2006.01) |
| *H04N 1/23* | (2006.01) |

(52) U.S. Cl.
CPC ......... *B41J 2/2054* (2013.01); *B41J 2/2139* (2013.01); *B41J 2/2142* (2013.01); *B41J 29/393* (2013.01); *G06K 15/102* (2013.01); *G06K 15/1868* (2013.01); *H04N 1/00015* (2013.01); *H04N 1/00045* (2013.01); *H04N 1/00082* (2013.01); *H04N 1/2346* (2013.01); *H04N 1/401* (2013.01); *H04N 1/40006* (2013.01); *H04N 1/409* (2013.01); *B41J 2029/3935* (2013.01)

(56) References Cited

U.S. PATENT DOCUMENTS

| | | | |
|---|---|---|---|
| 9,469,124 B2* | 10/2016 | Ishida | .............. B41J 2/2132 |
| 2012/0075375 A1* | 3/2012 | Ebisawa | .............. B41J 2/2139 |
| | | | 347/15 |
| 2014/0085371 A1 | 3/2014 | Ebisawa et al. | |

FOREIGN PATENT DOCUMENTS

| | | |
|---|---|---|
| JP | 2014-69324 | 4/2014 |
| JP | 2014-91304 | 5/2014 |

\* cited by examiner

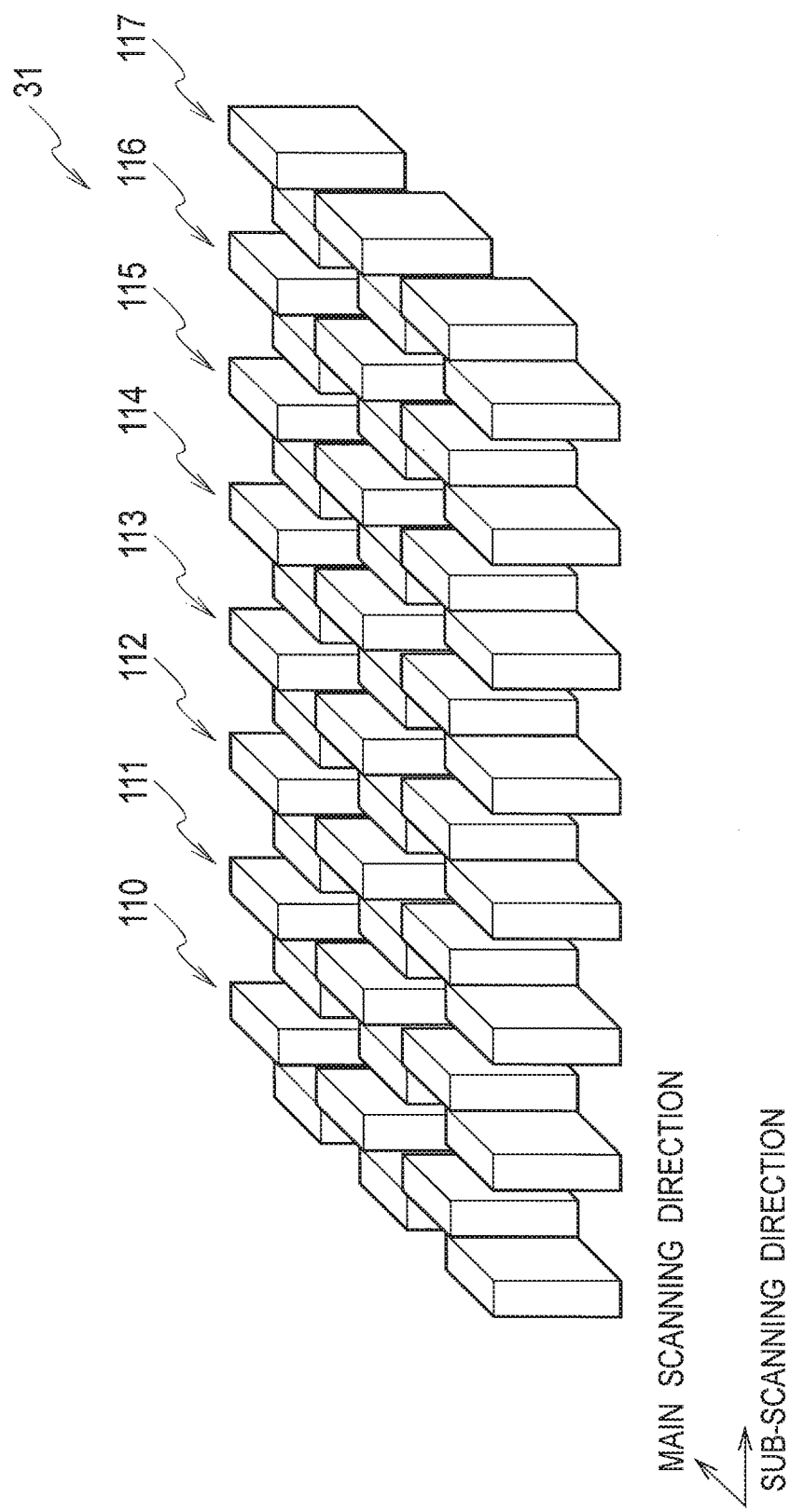

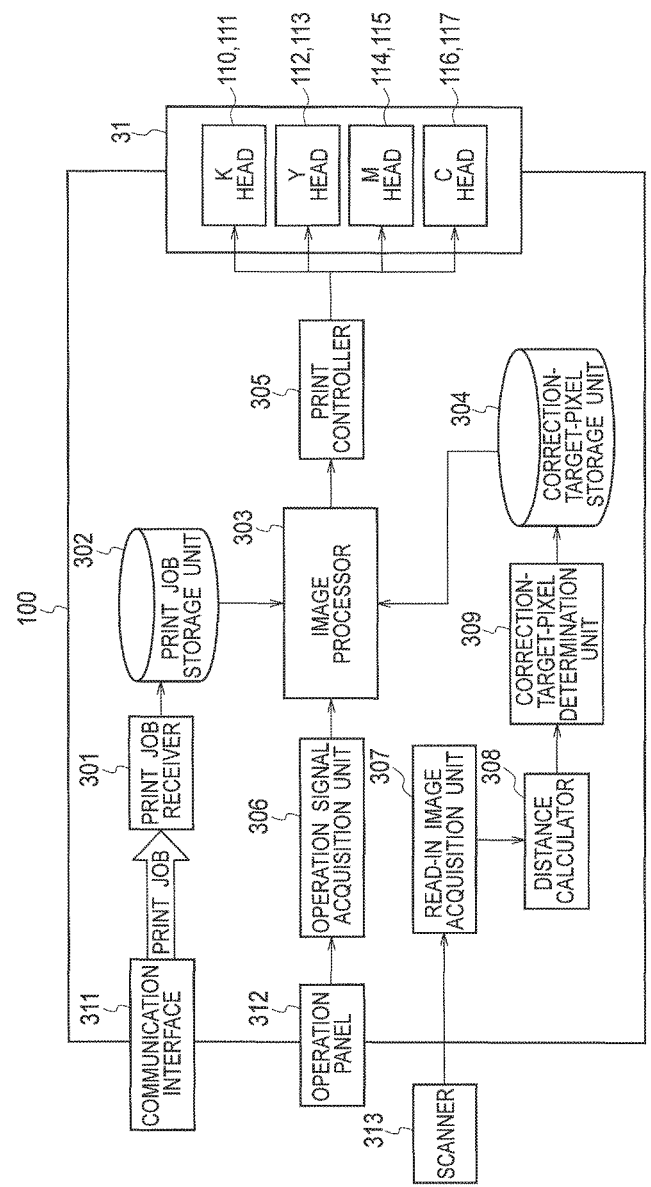

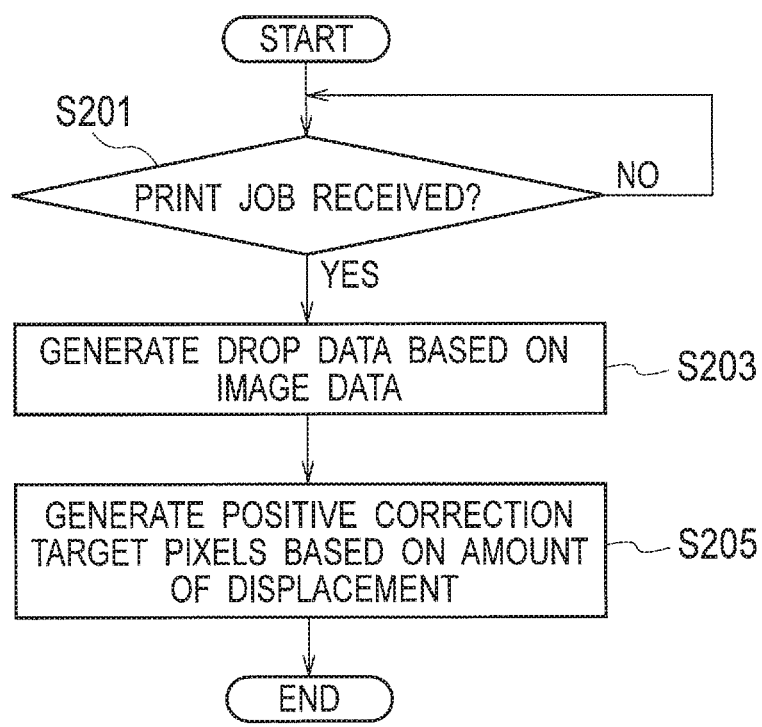

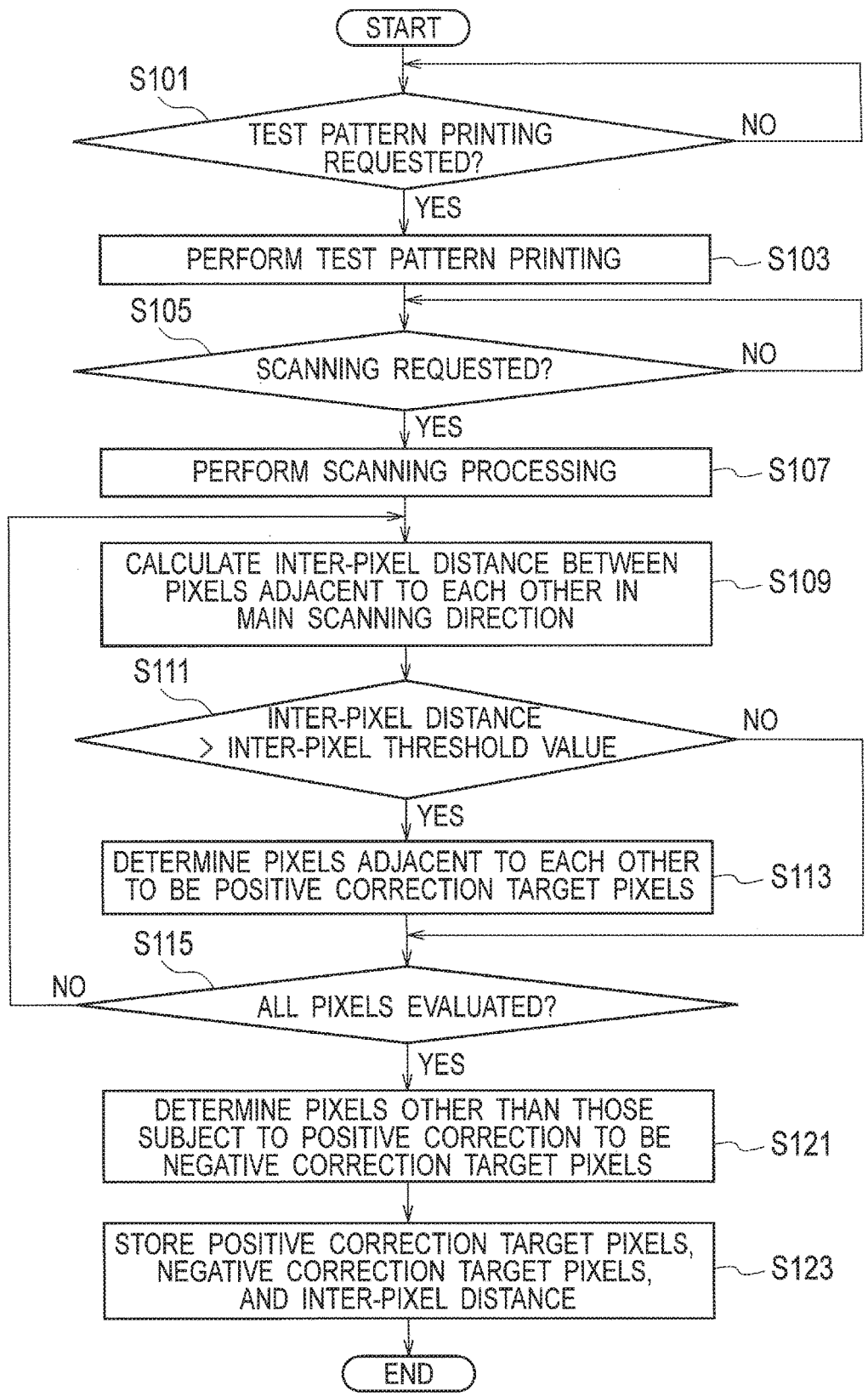

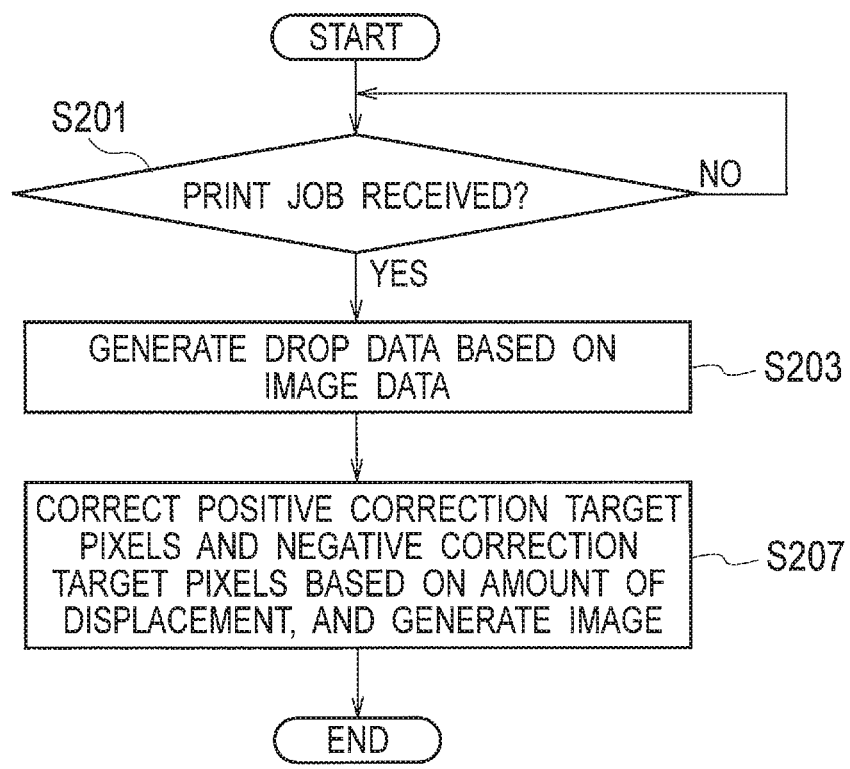

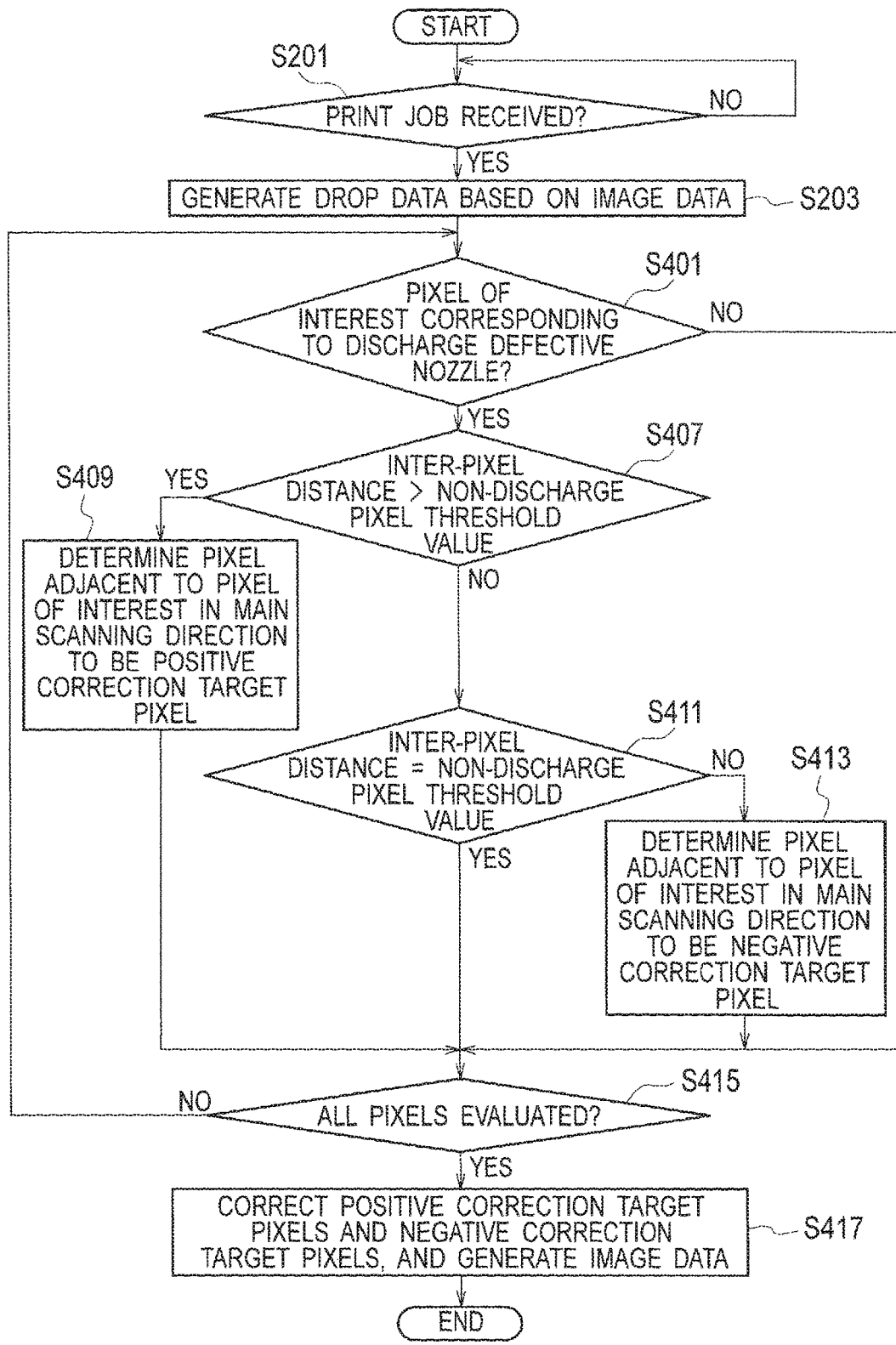

INKJET PRINTER CORRECTING IMAGE DATA BASED ON CALCULATED INKJET HEAD DISPLACEMENT AND INTER-PIXEL DISTANCES

BACKGROUND

1. Technical Field

The present invention relates to an inkjet printing machine configured to prevent unevenness of density by appropriate correction even when positional displacement of an inkjet head is generated in the main scanning direction.

2. Related Art

A full-line-type inkjet printing machine includes inkjet heads corresponding to ink colors C (cyan), M (magenta), Y (yellow), and K (black). The printing machine performs printing line by line by discharging ink from the inkjet heads while transferring a sheet in a direction perpendicular to the direction of rows of inkjet heads by using a transfer belt provided under the inkjet heads.

Some of such inkjet printing machines may have a plurality of rows of inkjet heads respectively provided along a main scanning direction for each ink color. In addition, a printing speed which is number-of-rows times as high as an inkjet printing machine having a single inkjet head row can be obtained by discharging ink sequentially from the inkjet heads. For example, an inkjet printing machine provided with two rows of inkjet heads can perform printing processing at a printing speed twice as high as an inkjet printing machine provided with a single row of inkjet heads.

In such an inkjet printing machine provided with a plurality of rows of inkjet heads respectively for each ink color, positional displacement of inkjet heads may be generated due to an installation error of an inkjet head or an impact on the machine during transportation, which may cause density unevenness in the printed image.

Patent Document 1 discloses a technique related to an inkjet printing apparatus configured to obtain, from the analysis result of recording media and discharged patterns, the amount of displacement in the sheet transfer direction (sub-scanning direction) and the nozzle row direction (the main scanning direction), correct the discharge timing in the sheet transfer direction, and correct the discharge timing by shifting the data to be printed in the nozzle row direction.

Patent Document 1: Japanese Patent Application Laid-Open Publication No. 2014-91304

SUMMARY

However, the technique described in Patent Document 1 performs correction at the discharge timing or by shifting the data to be printed for each pixel and thus it has been difficult to appropriately perform correction when positional displacement by one pixel or less is generated. Accordingly, density unevenness may be generated in the printed image.

The present invention has been made in view of the above problem. An object of the present invention is to provide an inkjet printing machine configured to prevent density unevenness by appropriate correction even when positional displacement of an inkjet head is generated in the main scanning direction.

In order to achieve the aforementioned object, a first characteristic of an inkjet printing machine according to the present invention includes: an inkjet head unit having, along a main scanning direction, inkjet heads of a same color provided in a plurality of rows in a sub-scanning direction, the inkjet head unit being configured to discharge ink, on a sheet transferred in the sub-scanning direction, sequentially in the sub-scanning direction from nozzles of the inkjet heads arranged in the plurality of rows; a distance calculator configured to calculate, based on test image data read from a sheet subjected to test printing by discharge from nozzles, an amount of displacement between inkjet heads of the same color in the main scanning direction, and calculate an inter-pixel distance between pixels adjacent in the main scanning direction; and an image processor configured to correct image data included in a received print job so as to increase, in accordance with the amount of displacement, an amount of ink to be discharged from nozzles corresponding to positive correction target pixels whose calculated inter-pixel distance exceeds a predetermined distance.

A second characteristic of the inkjet printing machine according to the present invention lies in the fact that the image processor further corrects the image data so as to decrease, in accordance with the amount of displacement, an amount of ink to be discharged from nozzles corresponding to negative correction target pixels, which are pixels other than the positive correction target pixel.

A third characteristic of the inkjet printing machine according to the present invention includes: an inkjet head unit having, along a main scanning direction, inkjet heads of a same color provided in a plurality of rows in a sub-scanning direction, the inkjet head unit being configured to discharge ink, on a sheet transferred in the sub-scanning direction, sequentially in the sub-scanning direction from nozzles of the inkjet heads arranged in the plurality of rows; a distance calculator configured to determine a non-discharge nozzle based on test image data read from a sheet subjected to test printing by discharge from nozzles, and to calculate an amount of displacement in the main scanning direction of an inkjet head having the determined non-discharge nozzle relative to an inkjet head of the same color, and an inter-pixel distance between neighboring pixels adjacent to both sides of a pixel corresponding to the non-discharge nozzle in the main scanning direction; and an image processor configured to correct image data included in a received print job so as to increase, in accordance with the amount of displacement, an amount of ink to be discharged from nozzles corresponding to, among the neighboring pixels, positive correction target pixels for the calculated inter-pixel distance which exceeds a predetermined distance.

BRIEF DESCRIPTION OF DRAWINGS

The invention will now be described with reference to the accompanying drawings wherein:

FIG. 2 is a perspective view of an inkjet head unit of a printing unit included in the inkjet printing machine according to the first embodiment of the present invention;

FIG. 3 is a block diagram explaining a function of a controller included in an inkjet printing machine 1 according to the first embodiment of the present invention;

FIG. 9 is a flowchart illustrating a procedure of image correction processing of an inkjet printing machine according to the first embodiment of the present invention;

FIG. 10 is a flowchart illustrating a procedure of distance calculation processing of an inkjet printing machine according to a second embodiment of the present invention;

FIG. 11 is a flowchart illustrating a procedure of image correction processing of an inkjet printing machine according to the second embodiment of the present invention;

FIG. 15 is a flowchart illustrating a procedure of image correction processing of an inkjet printing machine according to the third embodiment of the present invention;

DETAILED DESCRIPTION

Embodiments of the present invention will be described below with reference to the drawings. Furthermore, the embodiments described below are merely examples of the present invention, and thus the inkjet printing machine according to the present invention is not limited to the embodiments described below.

First Embodiment

In a first embodiment of the present invention, there will be described, as an example, an inkjet printing machine 1 including inkjet heads provided in two rows in a sub scanning direction so as to discharge ink of a same color along a main scanning direction, and causing ink to be discharged sequentially in the sub-scan direction from nozzles of the inkjet heads provided in two rows, on a sheet transferred in the sub-scanning direction.

<Overall Configuration of Inkjet Printing Machine>

A configuration of the inkjet printing machine 1 according to a first embodiment of the present invention will be described in detail.

Figure 1:
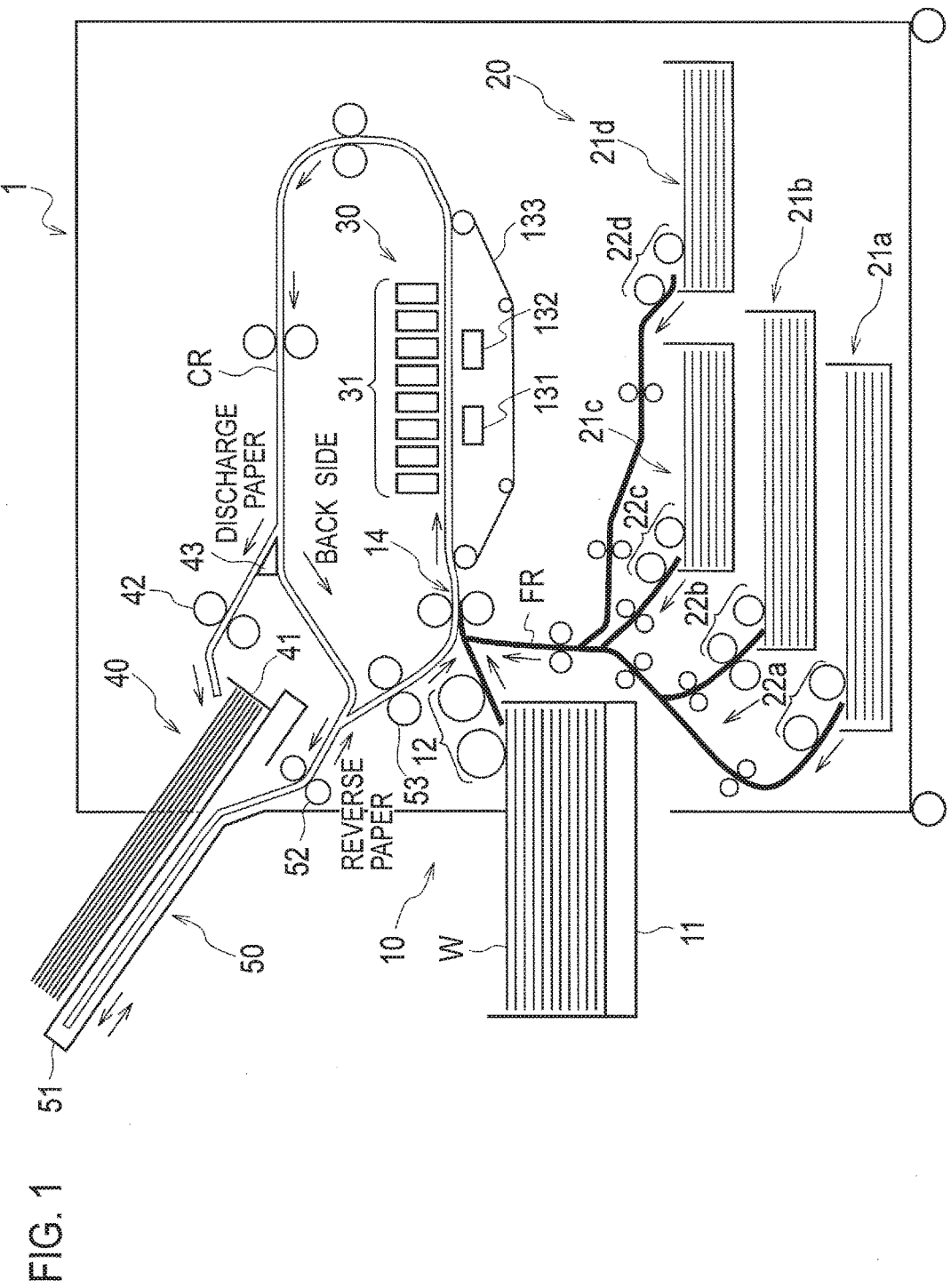
FIG. 1 is a configuration diagram illustrating a configuration of an inkjet printing machine according to a first embodiment of the present invention.

FIG. 1 is a configuration diagram illustrating a configuration of the inkjet printing machine 1 according to the first embodiment of the present invention.

As illustrated in FIG. 1, the inkjet printing machine 1 has a side paper feed unit 10, an internal paper feed unit 20, a printing unit 30, a paper discharge unit 40, and a reversing unit 50.

The side paper feed unit 10 includes a paper feed tray 11 on which printing sheets W are stacked, a primary paper feed unit 12 configured to transfer only the printing sheet W on the uppermost position from the paper feed tray 11 to a paper feed transfer path FR, and a secondary paper feed unit 14 configured to transfer the printing sheet W transferred by the primary paper feed unit 12 to a circulation transfer path CR.

The transfer internal paper feed unit 20 includes a paper feed tray 21a having printing sheets W stacked thereon, a primary paper feed unit 22a configured to transfer only the printing sheet W on the uppermost position from the paper feed tray 21a to the paper feed transfer path FR, a paper feed tray 21b having printing sheets W stacked thereon, a primary paper feed unit 22b configured to transfer only the printing sheet W on the uppermost position from the paper feed tray 21b to the paper feed transfer path FR, a paper feed tray 21c having printing sheets W stacked thereon, a primary paper feed unit 22c configured to transfer only the printing sheet W on the uppermost position from the paper feed tray 21c to the paper feed transfer path FR, a paper feed tray 21d having printing sheets W stacked thereon, and a primary paper feed unit 22d configured to transfer only the printing sheet W on the uppermost position from the paper feed tray 21d to the paper feed transfer path FR.

As described above, printing sheets W are transferred to the secondary paper feed unit 14 from the side paper feed unit 10 and the internal paper feed unit 20, and furthermore, printing sheets W are also transferred from the reversing unit 50 described below.

Accordingly, there exists a junction point where a transfer path of printing sheets W being fed joins a path on which sheets subjected to printing on one side are circularly transferred, in front of the secondary paper feed unit 14 in the transfer direction. Based on the junction point, the path on the side of the paper feed unit is referred to as the paper feed transfer path FR, and the other paths are referred to as the circulation transfer path CR.

The printing unit 30 includes an inkjet head unit 31 having a plurality of print heads incorporated therein, and a circular transfer belt 133 provided on a side facing the inkjet head unit 31; and the printing sheet W fed by the secondary paper feed unit 14 is sucked onto the transfer belt 133 by suction fans 131 and 132 installed, in the circular transfer belt 133, corresponding to the back side of the sheet transfer path, and the printing sheet W is subjected to printing by using ink discharged from the inkjet head unit 31 while being transferred at a predetermined transfer speed.

The printing sheets W subjected to printing by the printing unit 30 are transferred in the housing to the circulation transfer path CR by transfer rollers or the like arranged on the circulation transfer path CR. On the circulation transfer path CR, there is provided a switching mechanism 43 configured to switch between whether to guide the printing sheet W transferred on the circulation transfer path CR to the paper discharge unit 40 or whether to recirculate them on the circulation transfer path CR.

The switching mechanism 43 performs switching in order to guide the printing sheet W to either the paper discharge unit 40 or the reversing unit 50 described below.

The paper discharge unit 40 has a tray-shaped paper receiving tray 41 projecting from the housing of the inkjet printing machine 1, and a pair of paper discharge rollers 42 configured to guide the printing sheet W to the paper receiving tray 41. In addition, the printing sheets W guided to the paper discharge unit 40 by the switching mechanism 43 are transferred to the paper receiving tray 41 by the paper discharge roller 42, and stacked on the paper receiving tray 41 with the printing surface facing downward.

The reversing unit 50 includes a reversing tray 51 configured to reverse the printing sheet W, and a reversing roller 52 configured to transfer the printing sheet W from the circulation transfer path CR to the reversing tray 51, or to transfer the printing sheet W from the reversing tray 51 to the circulation transfer path CR.

The printing sheets W guided to the reversing unit 50 by the switching mechanism 43 are transferred from the circulation transfer path CR to the reversing tray 51 by the reversing roller 52, and after a predetermined period has passed, transferred from the reversing tray 51 to the circulation transfer path CR to thereby be reversed upside down relative to the circulation transfer path CR. In addition, the printing sheets W reversed upside down are transferred on the circulation transfer path CR to the printing unit 30 by a plurality of rollers such as transfer roller 53 provided on the circulation transfer path CR.

FIG. 2 is perspective view of the inkjet head unit 31 of the printing unit 30 included in the inkjet printing machine 1 according to the first embodiment of the present invention.

As illustrated in FIG. 2, the inkjet head unit 31 has a plurality of line-typeinkjet heads 110 to 117 arranged along the main scanning direction (direction perpendicular to the transfer direction of the printing sheet W).

The inkjet heads 110 to 117 are fixedly held on a head holder (not illustrated) above a transfer unit 32 at predetermined intervals.

The inkjet heads 110 and 111 are configured to respectively discharge black (K) ink on the printing sheet W line by line. When performing printing, landing positions of ink discharged from the inkjet head 110 and landing positions of ink discharged from the inkjet head 111 are controlled so as to alternate with each other in the sub-scanning direction.

In the same way, the inkjet heads 112 and 113 are configured to respectively discharge cyan (C) ink on the printing sheet W line by line, the inkjet heads 114 and 115 are configured to respectively discharge magenta (M) ink on the printing sheet W line by line, and the inkjet heads 116 and 117 are configured to respectively discharge yellow (Y) ink on the printing sheet W line by line. Then, in the same way as the inkjet heads 110 and 111, the inkjet heads 112 to 117 are controlled so that the landing positions of respective ink colors alternate with each other in the sub-scanning direction.

FIG. 3 is a block diagram explaining a function of a controller 100 included in the inkjet printing machine 1 according to the embodiment of the present invention.

As illustrated in FIG. 3, the inkjet printing machine 1 includes a communication interface 311 which is a module for printing data received via a network, an operation panel 312 configured to accept a user's operation, a scanner 313 configured to read image data from an original sheet, the controller 100, and the inkjet head unit 31.

The communication interface 311 is a communication interface configured to transmit and receive data to and from user terminals (not illustrated), and receives print jobs by performing data communication through the use of, for example, a wired/wireless LAN, a serial method, a USB, or the like.

The operation panel 312 is a module configured to accept an instruction operation or a setting operation performed by a user, and accepts, for example, an execution instruction of test pattern printing in the present embodiment.

The scanner 313 has an image sensor such as a CIS (Contact Image Sensor) or a CCD (Charge Coupled Devices), and the image sensor is configured to read an original placed on an original tray, and to output the read-in image data to the controller 100.

The controller 100 includes, as its functions, a print job receiver 301, a print job storage unit 302, an image processor 303, a correction-target-pixel storage unit 304, a print controller 305, an operation signal acquisition unit 306, a read-in image acquisition unit 307, a distance calculator 308, and a correction-target-pixel determination unit 309.

The print job receiver 301 is a module configured to receive a print job written in a page description language or the like, and store the received print job in the print job storage unit 302. For example, a print job including image data is input from a user terminal (not illustrated) connected via the communication interface 311, to thereby be stored in the print job storage unit 302. The image data included in the print job input to the print job receiver 301 is data indicating characters or pictures, which are expressed by data such as vector format data or outline font data. In addition, the color space is expressed by the RGB color system, or L*a*b* color system.

The print job storage unit 302 is a volatile memory configured to erase data stored therein when power supply is shut down. The print job storage unit 302 stores print jobs transmitted and received from a user terminal.

The image processor 303 is an arithmetic operation processor configured to perform digital signal processing devoted to image processing, extracts image data from a print job stored in the print job storage unit 302 and performs RIP processing (color conversion and BitMap conversion) on the extracted image data to thereby convert vector format data, outline font data, or the like into BitMap format data, and eventually generate image data (drop data) indicating the number of drops of ink to be discharged from the inkjet heads 110 to 117.

In addition, the image processor 303 generates test pattern image data. Here, test pattern image data refers to image data (drop data) causing ink to be discharged from all the nozzles of the inkjet heads 110 to 117 in order to calculate the inter-pixel distance as described below.

The correction-target-pixel storage unit 304 stores therein information indicating which of the pixels determined by the correction-target-pixel determination unit 309 described below for each ink color is a positive correction target pixel, information indicating which of the pixels is a negative correction target pixel, and the amount of displacement of an inkjet head.

The print controller 305 is a module configured to control the drive of the inkjet head 110 of each color and the operation of the drive unit of the transfer path, and to control the entire imaging processing, performs image formation at a timing and printing speed in accordance with scheduling. More specifically, the print controller 305 performs line-by-line printing on a sheet transferred by discharging ink from the inkjet head unit 31, based on the image data (drop data) and the test pattern image data (drop data) generated by the image processor 303.

The operation signal acquisition unit 306 is a module configured to receive a user operation signal via the operation panel 312, analyzes the received operation signal, and causes other modules to execute processing in accordance with the user operation.

When an original subject to printing based on test pattern image data (drop data) is placed on the original tray of the scanner 313, and when the image sensor reads the original, the read-in image acquisition unit 307 outputs the read-in-test-pattern image data to the distance calculator 308.

The distance calculator 308 calculates the amount of displacement between inkjet heads of the same color in the main scanning direction and the inter-pixel distance of pixels adjacent in the main scanning direction, based on test image data read by a sheet subjected to test printing by discharge from nozzles.

Note that, in the third and the fourth embodiments described below, the distance calculator 308 determines a non-discharge nozzle based on test image data read from a sheet subjected to test printing by discharge from nozzles, and calculates the amount of displacement of an inkjet head having the determined non-discharge nozzle relative to an inkjet head of the same color in the main scanning direction, and the inter-pixel distance between neighboring pixels adjacent to both sides of a pixel corresponding to the non-discharge nozzle in the main scanning direction.

When it is specified that the inter-pixel distance exceeds a predetermined inter-pixel threshold value, the correction-target-pixel determination unit 309 determine, to be positive correction target pixels, two pixels adjacent to each other and separated by the inter-pixel distance, and additionally, in the second embodiment described below, the correction-target-pixel determination unit 309 determines, to be negative correction target pixels, the pixels other than those determined as the positive correction target pixels.

The image processor 303 corrects the image data included in the received print job so as to increase, in accordance with the amount of displacement, the amount of ink to be discharged from nozzles corresponding to positive correction target pixels whose calculated inter-pixel distance exceeds a predetermined distance. Additionally, in the second embodiment, the image processor 303 further corrects the image data so as to decrease, in accordance with the amount of displacement, the amount of ink to be discharged from nozzles corresponding to negative correction target pixels whose calculated inter-pixel distance is smaller than the predetermined distance.

Note that, in the third and the fourth embodiments, the image processor 303 corrects the image data included in the received print job so as to increase, in accordance with the amount of displacement, the amount of ink to be discharged from nozzles corresponding to, among the neighboring pixels, positive correction target pixels whose calculated inter-pixel distance exceeds the predetermined distance.

<Correction of Image Data>

Correction of image data by the image processor 303 will be described in detail below.

Figure 4A:
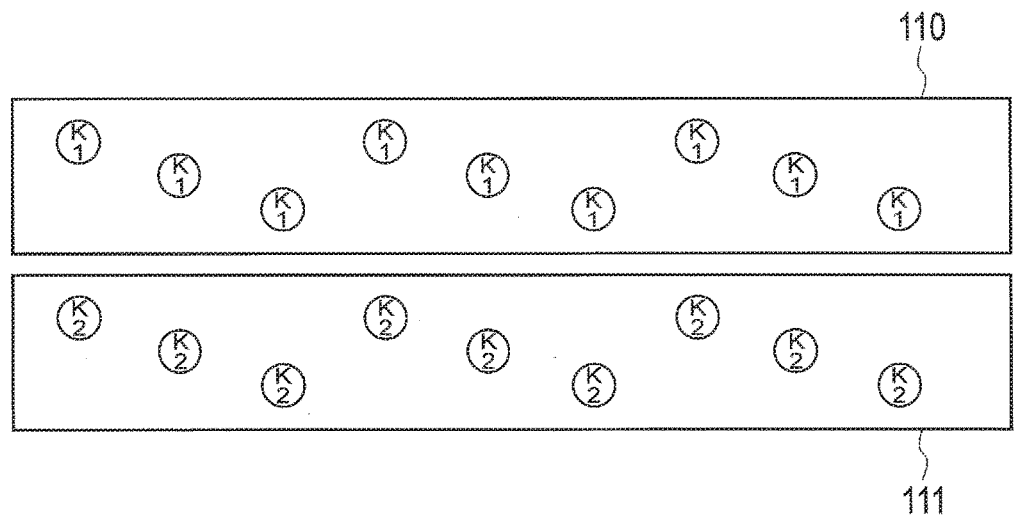
FIG. 4A illustrates positions of nozzles provided on respective inkjet heads.
Figure 4B:
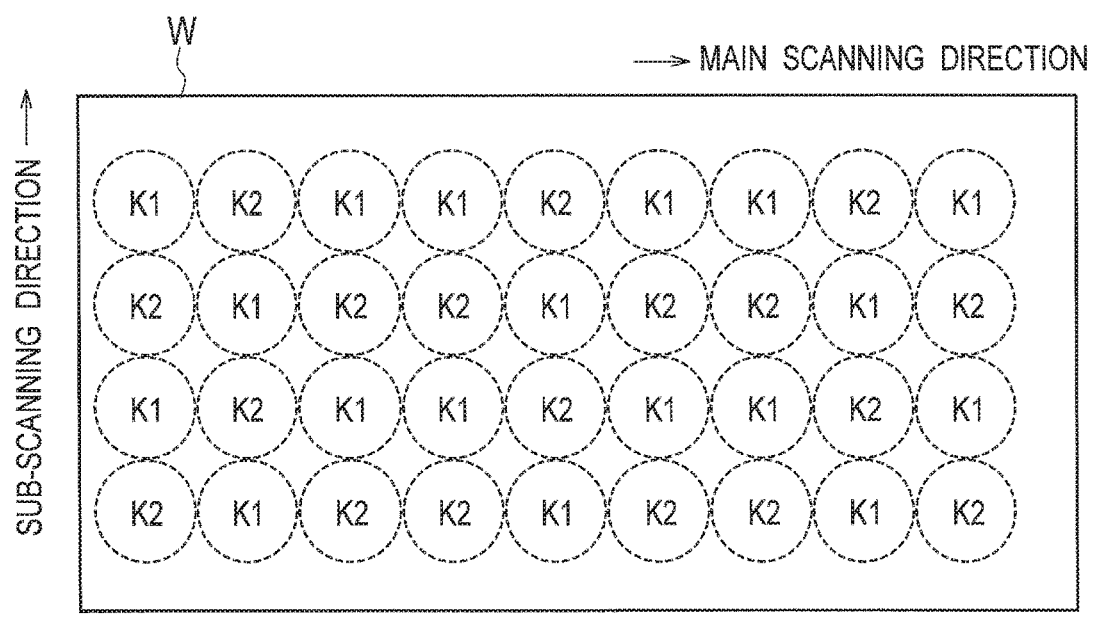
FIG. 4B is a diagram illustrating landing positions of ink discharged from nozzles of the inkjet heads illustrated in FIG. 4A.

FIG. 4A illustrates positions of nozzles, respectively, provided on the inkjet heads 110 and 111. FIG. 4B illustrates landing positions of ink discharged from nozzles of the inkjet heads 110 and 111 illustrated in FIG. 4A. Note that, although a description will be given here, as an example, of the inkjet heads 110 and 111 configured to discharge black (K) ink, the same applies to the inkjet heads 112 and 113 configured to discharge cyan (C) ink, the inkjet heads 114 and 115 configured to discharge magenta (M) ink, and the inkjet heads 116 and 117 configured to discharge yellow (Y) ink, and thus explanation thereof is omitted.

As illustrated in FIG. 4A, nozzles are arranged on the inkjet head 110 at a regular interval in the main scanning direction, while every three nozzles are shifted from each other in the sub-scanning direction.

Then, as illustrated in FIG. 4B, the landing positions (denoted as "K1") of ink discharged from the inkjet head 110 and the landing positions (denoted as "K2") of ink discharged from the inkjet head 111 are controlled so as to alternate with each other in the sub-scanning direction.

Accordingly, ink discharged from the inkjet heads 110 and 111 is landed in alignment in both the main scanning direction and the sub-scanning direction, thereby forming pixels having a uniform density. In the example illustrated in FIG. 4B, the pixels formed by ink drops discharged from the inkjet heads 110 and 111 and landed, adjacent to each other in the main scanning direction come into contact with each other, and thus the inter-pixel distance s is all "zero".

As described above, ink discharged from the inkjet heads 110 and 111 is landed in alignment if the inkjet heads 110 and 111 are arranged with a good accuracy, thereby forming pixels having a uniform density. However, an installation error of the inkjet head 110 or an impact on the machine during transportation may cause a positional displacement between the inkjet heads 110 of the same color. In such a case, ink discharged from the inkjet heads 110 and 111 is not landed in alignment at a regular interval, which may result in a non-uniform density.

Figure 5A:
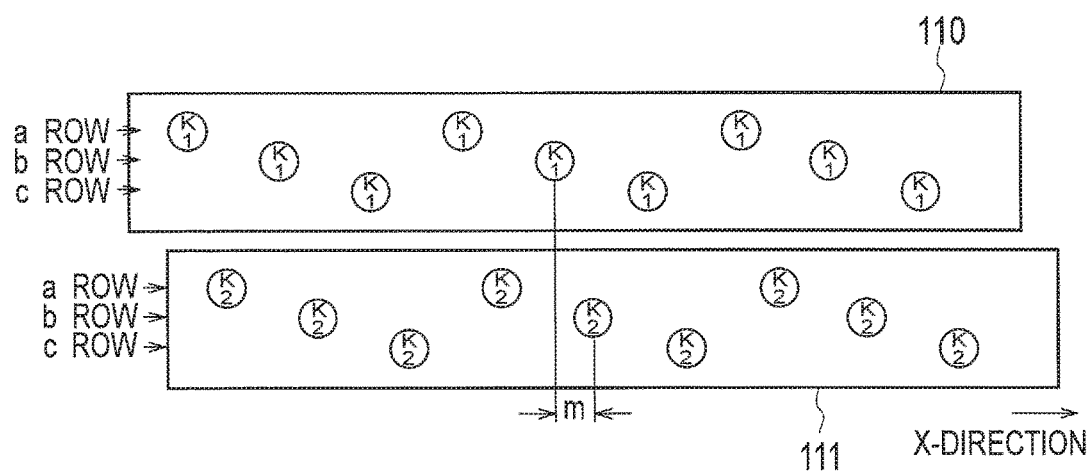
FIG. 5A illustrates an exemplary state in which positional displacement of an inkjet head relative to another inkjet head by "m" (mm) is generated in the X-direction, that is, in the main scanning direction.
Figure 5B:
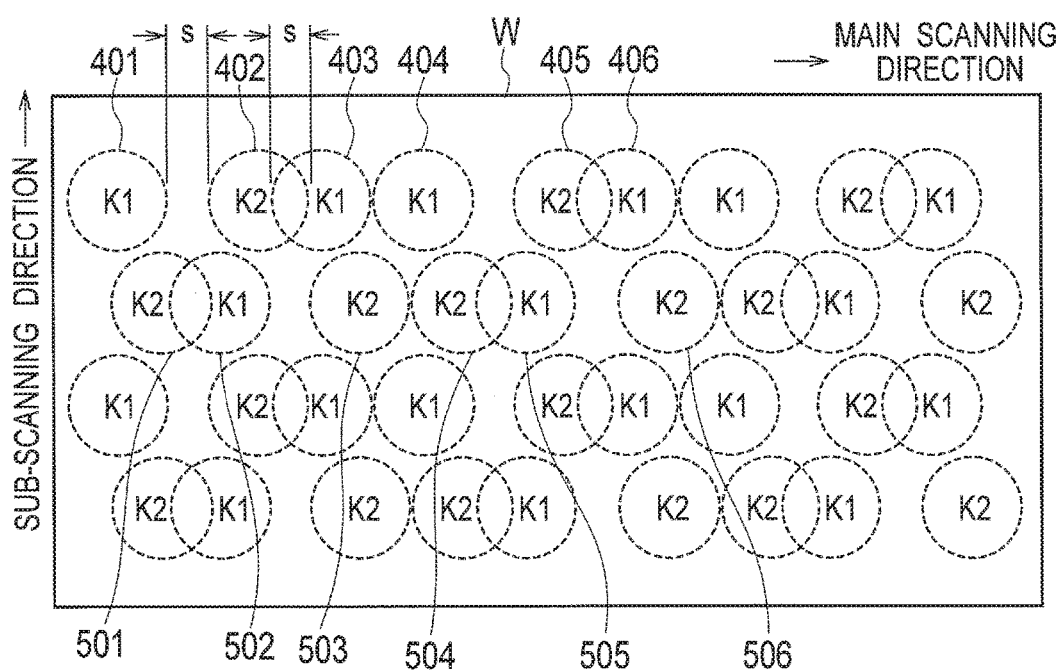
FIG. 5B is a diagram illustrating landing positions of ink discharged from nozzles of the inkjet heads illustrated in FIG. 5A.

FIG. 5A illustrates an exemplary state in which positional displacement of the inkjet head 111 relative to the inkjet head 110 by "m" (mm) is generated in the X-direction, that is, in the main scanning direction. FIG. 5B illustrates landing positions of ink discharged from nozzles of the inkjet heads 110 and 111 illustrated in FIG. 5A.

Since the inkjet head 111 and the inkjet head 110 are controlled so that ink is alternately landed in the sub-scanning direction, the landing position K2 of ink discharged from the inkjet head 111 is displaced relative to the landing position K1 of ink discharged from the inkjet head 110 by "m" in the main scanning direction, when the inkjet head 111 is installed in a state of being displaced relative to the inkjet head 110 by "m" (mm) in the X-direction, as illustrated in FIG. 5A.

Due to the aforementioned displacement, the inter-pixel distance s between pixels discharged from the inkjet heads 110 and 111 illustrated in FIG. 5B and landed adjacent to each other in the main scanning direction may be widened, narrowed, or remain unchanged.

For example, in the example illustrated in FIG. 5B, the inter-pixel distance s between the pixel 401 discharged from the inkjet head 110 and the pixel 402 discharged from the inkjet head 111 is widened. On the other hand, a pixel 403 discharged from the inkjet head 110 and the pixel 402 discharged from the inkjet head 111 overlap with each other and thus the inter-pixel distance s is narrowed. In addition, the inter-pixel distance s between the pixels 403 and 404 both discharged from the inkjet head 110 remains unchanged, that is, "zero".

In the inkjet heads 110 and 111, nozzles are arranged at regular intervals in the main scanning direction while being shifted to row a, row b and row c in the sub-scanning direction, for every three nozzles, and thus the inter-pixel distance s which is widened, narrowed, or remains unchanged is determined depending on which row the nozzle is provided. When, for example, positional displacement of the inkjet head 111 relative to the inkjet head 110 by "m" (mm) is generated in the X-direction, that is, in the main scanning direction, the inter-pixel distance s between a pixel (for example, pixel 401) corresponding to a nozzle of row a of the inkjet head 110 and a pixel (for example, pixel 402) corresponding to a nozzle of row b of the inkjet head 111 is widened in accordance with the amount of displacement, and also the inter-pixel distance s between a pixel (for example, pixel 502) corresponding to a nozzle of row b of the inkjet head 110 and a pixel (for example, pixel 503) corresponding to a nozzle of row c of the inkjet head 111 is widened in accordance with the amount of displacement.

On the other hand, the inter-pixel distance s between a pixel (for example, pixel 402) corresponding to a nozzle of row b of the inkjet head 111 and a pixel (for example, pixel 403) corresponding to a nozzle of row c of the inkjet head 110 is narrowed in accordance with the amount of displacement, and also the inter-pixel distance s between a pixel (for example, pixel 501) corresponding to a nozzle of row a of the inkjet head 111 and a pixel (for example, pixel 502) corresponding to a nozzle of row b of the inkjet head 110 is narrowed in accordance with the amount of displacement.

In addition, the inter-pixel distance s between pixels (for example, pixels 403 and 404, or pixels 503 and 504) corresponding to nozzles respectively provided on the same inkjet head, that is, the inkjet head 110 or 111 remains unchanged, that is, "zero".

Therefore, the amount of displacement of the inkjet head 111 can be calculated according to the positions of pixels (for example, pixels 401 and 402) between which the inter-pixel distance s is widened, or pixels (for example, pixels 402 and 403) between which the inter-pixel distance s is narrowed.

Figure 6:
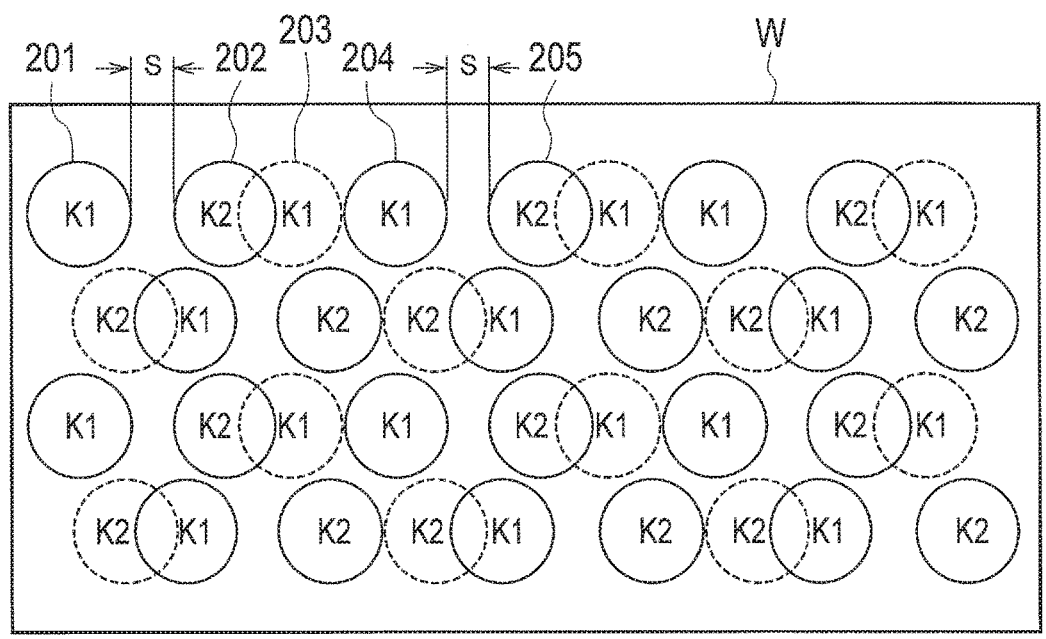
FIG. 6 is a diagram illustrating, by solid lines, positive correction target pixels discharged from nozzles of the inkjet head.

In addition, the image processor 303 determines the pixels between which the inter-pixel distance s exceeds the inter-pixel threshold value (predetermined distance) to be positive correction target pixels. When the inter-pixel threshold value is "zero", the pixels indicated by solid lines in the case of, for example, pixels 201, 202, 204, 205, or the like, are determined to be positive correction target pixels, as illustrated in FIG. 6 when positional displacement of the inkjet head 111 relative to the inkjet head 110 by "m" (mm) is generated in the X-direction, that is, in the main scanning direction.

The image processor 303 then increases the number of drops with respect to the determined positive correction target pixels in accordance with the amount of displacement m. On the other hand, with respect to the pixels indicated by dashed lines in the case of the pixel 203 or the like, the image processor 303 determines the number of drops based on the image data, without increasing or decreasing the number of drops.

Figure 7:
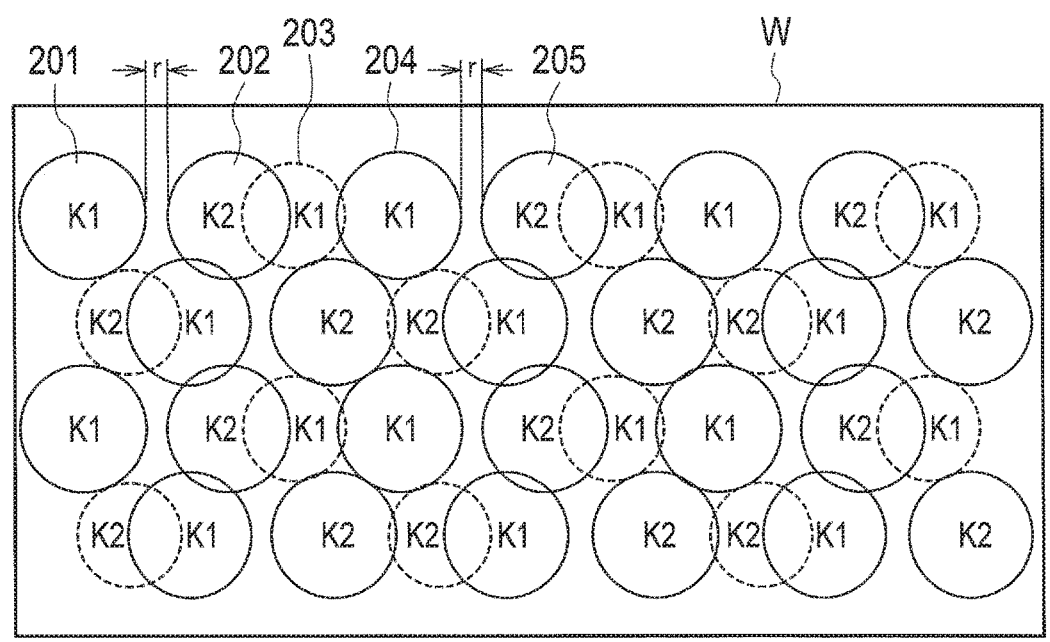
FIG. 7 is a diagram illustrating exemplary pixels formed by discharging ink from the inkjet head based on corrected image data.

FIG. 7 is a diagram illustrating exemplary pixels formed by discharging ink from the inkjet head 110 based on the corrected image data.

As illustrated in FIG. 7, since the number of drops is increased with respect to positive correction target pixels in accordance with the amount of displacement m, the inter-pixel distance r after the correction of increasing the number of drops is smaller than the inter-pixel distance s before the correction.

Accordingly, even when positional displacement is generated between the inkjet head 111 and the inkjet head 110, the inter-pixel distance can be narrowed when the inter-pixel distance is widened due to the positional displacement, and thus the inter-pixel distance remains unchanged. Alternatively, when the inter-pixel distance is narrowed, ink is discharged without changing the inter-pixel distance. Therefore, an appropriate correction can be made in accordance with the amount of displacement of pixels in the main scanning direction, whereby the generation of density unevenness in the printed image can be prevented.

Note that, although the inter-pixel distance s is defined here as the distance between the outer circumferences of pixels formed by discharging ink from the inkjet head 110, this is not limiting and it goes without saying that the distance between the centers of pixel may be used as the inter-pixel distance s.

<Operation of the Inkjet Printing Machine 1>

Next, the operation of the inkjet printing machine 1 according to the first embodiment of the present invention will be described.

The inkjet printing machine 1 according to the first embodiment of the present invention mainly performs distance calculation processing and image correction processing. Respective processing will be described in detail below. Note that, although a description will be given here, as an example, of the inkjet heads 110 and 111 configured to discharge black (K) ink, the same applies to the inkjet heads 112 and 113 discharging cyan (C) ink, the inkjet heads 114 and 115 discharging magenta (M) ink, and the inkjet heads 116 and 117 discharging yellow (Y) ink.

<<Distance Calculation Processing>>

Figure 8:
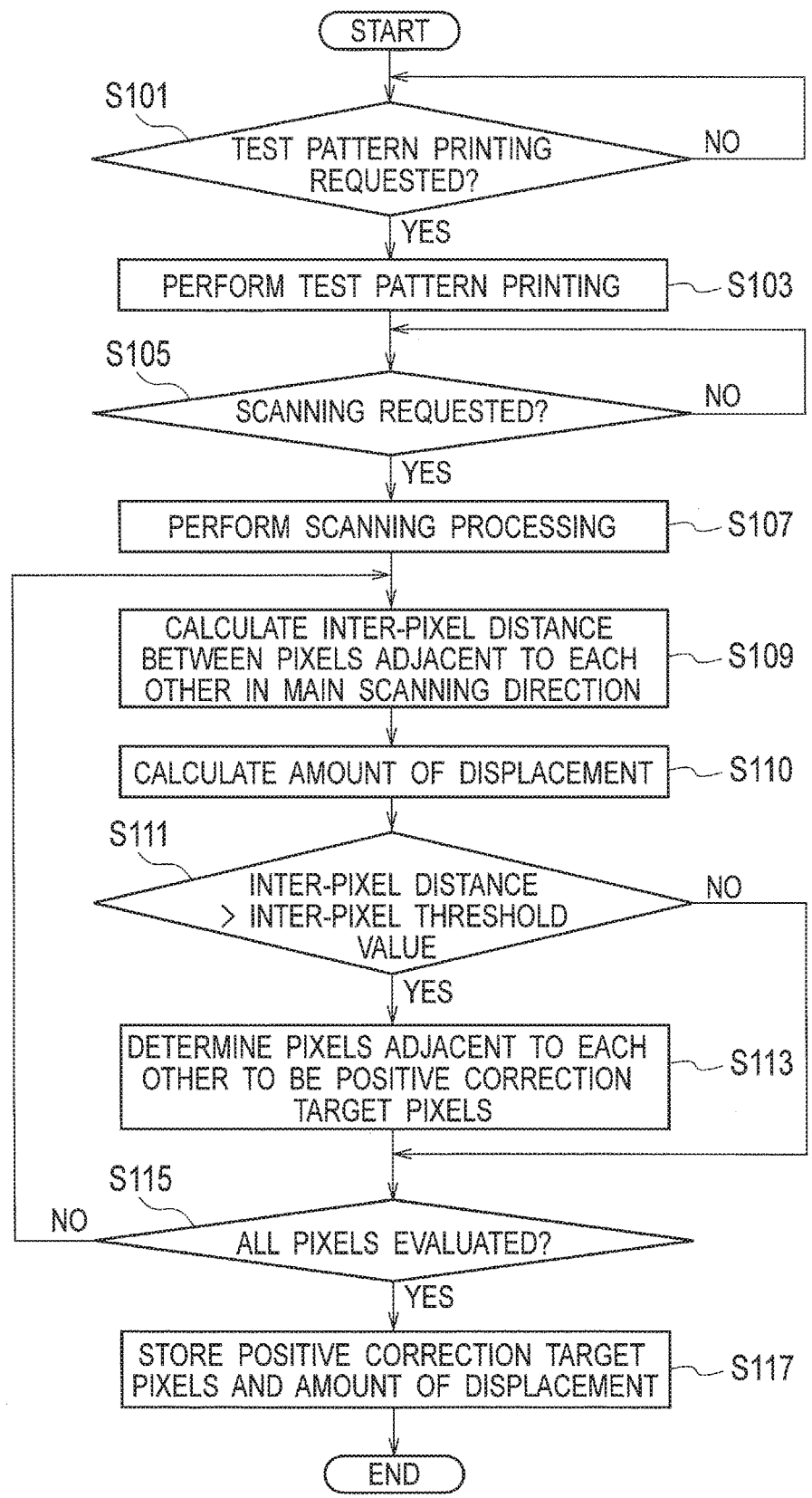
FIG. 8 is a flowchart illustrating a procedure of distance calculation processing of an inkjet printing machine according to the first embodiment of the present invention.

FIG. 8 is a flowchart illustrating a procedure of distance calculation processing of an inkjet printing machine 1 according to the first embodiment of the present invention.

When, as illustrated in FIG. 8, test pattern printing is requested from the operation panel 312 ("YES" at step S101), the image processor 303 generates test pattern image data, and the print controller 305 executes the test pattern printing by discharging ink from the inkjet head unit 31, based on the generated test pattern image data (step S103).

In addition, when an original subjected to printing based on test pattern image data is placed on the original tray of the scanner, and scanning is requested from the operation panel 312 ("YES" at step S105), the scanner 313 performs scanning processing (step S107).

The read-in-test-pattern image data read by the scanner 313 is output to the distance calculator 308, and the distance calculator 308 calculates the inter-pixel distance s between pixels adjacent to each other in the main scanning direction, based on the entered read-in-test-pattern image data (step S109).

Next, the distance calculator 308 calculates the amount of displacement between the inkjet head 110 and the inkjet head 111 which both discharge black (K) ink, in the main scanning direction (step S110).

Then, the correction-target-pixel determination unit 309 determines whether or not the inter-pixel distance s calculated at step S109 exceeds the predetermined inter-pixel threshold value (step S111). When the inter-pixel threshold value is too large, a pixel becomes hard to be a correction target, and thus density unevenness may remain. On the other hand, when the inter-pixel threshold value is too small, a pixel not required to be corrected becomes a correction target, and thus there is a possibility of increased bleeding due to an excessive amount of ink. Accordingly, the inter-pixel threshold value is required to be preliminarily set to an appropriate value.

When it is determined at step S111 that the inter-pixel distance s exceeds the predetermined inter-pixel threshold value ("YES"), two pixels adjacent to each other and separated by the inter-pixel distance s are determined to be positive correction target pixels (step S113).

On the other hand, when it is determined at step S111 that the inter-pixel distance s is equal to or smaller than the predetermined inter-pixel threshold value ("NO"), the processing at step S113 is bypassed in order to skip correction, and the process proceeds to step S115.

At step S115, the correction-target-pixel determination unit 309 determines whether or not all the pixels have been evaluated (step S115). Accordingly, it is possible to determine, for all the pixels in the read-in-test-pattern image data subjected to test pattern printing and read in, whether or not they are positive correction target pixels.

When it is determined at step S115 that all the pixels have been evaluated ("YES"), the correction-target-pixel determination unit 309 stores, for each ink color, information indicating which pixels are positive correction target pixels, and the amount of displacement of the inkjet head in the correction-target-pixel storage unit 304 (step S117).

<<Image Correction Processing>>

FIG. 9 is a flowchart illustrating a procedure of image correction processing of an inkjet printing machine 1 according to the first embodiment of the present invention.

As illustrated in FIG. 9, when the print job receiver 301 receives print job via the communication interface 311 and stores it in the print job storage unit 302 ("YES" at step S201), the image processor 303 extracts image data from the print job stored in the print job storage unit 302, and performs RIP processing on the extracted image data to thereby generate drop data (step S203).

Next, the image processor 303 corrects the drop data, based on the information indicating positive correction target pixels and the amount of displacement stored in the correction-target-pixel storage unit 304, so as to increase, in accordance with the amount of displacement, the number of drops to be discharged from nozzles corresponding to positive correction target pixels (step S205).

Specifically, the image processor 303 calculates, using the following [Formula 1], the number of drops $D_a$ after correction to be discharged from nozzles corresponding to positive correction target pixels. Here, the number of drops before correction to be discharged from nozzles corresponding to positive correction target pixels is denoted as $D_b$, the nozzle pitch between the inkjet head 110 and the inkjet head 111 in the main scanning direction is denoted as P, and the amount of displacement of the inkjet head is denoted as m.

$$D_a = \frac{P+m}{P} \times D_b \quad \text{[Formula 1]}$$

Accordingly, the print controller 305 can execute printing by discharging ink from the inkjet heads 110 to 117, based on the drop data corrected so as to increase, in accordance with the amount of displacement, the number of drops to be discharged from nozzles corresponding to positive correction target pixels. Therefore, even when positional displacement is generated between the inkjet head 111 and the inkjet head 110, it is possible to narrow the inter-pixel distance between pixels whose inter-pixel distance is widened due to the positional displacement, whereby the generation of density unevenness in the printed image can be prevented.

As described above, the inkjet printing machine 1 according to the first embodiment of the present invention includes the distance calculator 308 configured to calculate the amount of displacement between inkjet heads of the same color in the main scanning direction and the inter-pixel distance between pixels adjacent to each other in the main scanning direction, based on read-in-test-pattern image data (test image data) read from an original subjected to printing based on test pattern image data subjected to printing by discharge from a plurality of nozzles, and an image processor 303 configured to correct image data included in a received print job so as to increase, in accordance with the amount of displacement, the amount of ink to be discharged from nozzles corresponding to positive correction target pixels whose calculated inter-pixel distance exceeds the inter-pixel threshold value (predetermined distance).

Therefore, even when positional displacement of an inkjet head is generated in the main scanning direction, it is possible to make an appropriate correction in accordance with the amount of displacement of pixels in the main scanning direction, whereby the generation of density unevenness in the printed image can be prevented.

Second Embodiment

In the first embodiment of the present invention, there has been described, as an example, the inkjet printing machine 1 configured to correct the image data included in the received print job so as to increase, according to the inter-pixel distance, the amount of ink to be discharged from nozzles corresponding to positive correction target pixels between which the inter-pixel distance exceeds the inter-pixel threshold value (predetermined distance).

In a second embodiment of the present invention, there will be described, as an example, the inkjet printing machine 1 configured to correct the image data included in the received print job so as to decrease, according to the inter-pixel distance, the amount of ink to be discharged from nozzles corresponding to negative correction target pixels, which are pixels other than those subject to positive correction. The inkjet printing machine 1 of the second embodiment has the same configuration as the inkjet printing machine 1 of the first embodiment illustrated in FIGS. 1 to 3, with only the operation being different, and thus the operation will be described referring to the reference numerals of the inkjet printing machine 1 of the first embodiment illustrated in FIGS. 1 to 3.

<<Distance Calculation Processing>>

FIG. 10 is a flowchart illustrating a procedure of distance calculation processing of the inkjet printing machine 1 according to the second embodiment of the present invention. Processes at steps S101 to S115 of the flowchart are identical to the processes at steps S101 to S115 in the flowchart of the distance calculation processing performed by the inkjet printing machine 1 according to the first embodiment illustrated in FIG. 8, and thus explanation thereof is omitted.

When, as illustrated in FIG. 10, it is determined at step S115 that all the pixels have been evaluated (YES), the correction-target-pixel determination unit 309 determines, to be negative correction target pixels, the pixels other than those determined at step S113 to be positive correction target pixels (step S121).

Next, the correction-target-pixel determination unit 309 stores, for each ink color, information indicating which pixels are positive correction target pixels or negative correction target pixels, and the amount of displacement of the inkjet head in the correction-target-pixel storage unit 304 (step S123).

<<Image Correction Processing>>

FIG. 11 is a flowchart illustrating a procedure of image correction processing of an inkjet printing machine 1 according to the second embodiment of the present invention. Processes at steps S201 to S203 of the flowchart are identical to the processes at steps S201 to S203 in the flowchart of the image correction processing performed by the inkjet printing machine 1 according to the first embodiment illustrated in FIG. 9, and thus explanation thereof is omitted.

As illustrated in FIG. 11, the image processor 303, upon generating drop data (step S203), corrects the drop data so as to increase, in accordance with the amount of displacement, the number of drops to be discharged from nozzles corresponding to positive correction target pixels, based on the positive correction target pixels and the amount of displacement stored in the correction-target-pixel storage unit 304, and also decrease, in accordance with the amount of displacement, the number of drops to be discharged from nozzles corresponding to negative correction target pixels, based on the negative correction target pixels and the amount of displacement (step S205).

Specifically, the image processor 303 calculates, by using the aforementioned [Formula 1], the number of drops $D_a$ after correction to be discharged from nozzles corresponding to positive correction target pixels, and also calculates, by using the following [Formula 2], the number of drops $D_c$ after correction to be discharged from nozzles corresponding to negative correction target pixels. Here, the number of the drops before correction to be discharged from nozzles corresponding to negative correction target pixels is denoted as $D_d$, the nozzle pitch between the inkjet head 110 and the inkjet head 111 in the main scanning direction is denoted as P, and the amount of displacement of the inkjet head is denoted as m.

$$D_c = \frac{P-m}{P} \times D_d \qquad \text{[Formula 2]}$$

Accordingly, the print controller 305 can execute printing by discharging ink from the inkjet heads 110 to 117, based on the drop data corrected so as to decrease, in accordance with the amount of displacement, the number of drops to be discharged from nozzles corresponding to negative correction target pixels.

As described above, the inkjet printing machine 1 according to the second embodiment of the present invention, the image processor 303 further corrects the drop data so to decrease, in accordance with the amount of displacement, the amount of ink to be discharged from nozzles corresponding to negative correction target pixels, which are pixels other than the positive correction target pixels.

Accordingly, in addition to the effect of the inkjet printing machine 1 according to the first embodiment, even when positional displacement is generated between the inkjet head 111 and the inkjet head 110, it is possible to reduce the size of pixels other than the pixels whose inter-pixel distance is widened due to the positional displacement, whereby bleeding can be suppressed.

Third Embodiment

In a third embodiment of the present invention, there will be described, as an example, the inkjet printing machine 1 configured to correct the image data included in the received print job so as to increase, in accordance with the amount of displacement, the amount of ink to be discharged from nozzles corresponding to neighboring pixels adjacent to both sides of a pixel corresponding to a non-discharge nozzle in the main scanning direction. The inkjet printing machine 1 of the third embodiment has the same configuration as the inkjet printing machine 1 of the first embodiment illustrated in FIGS. 1 to 3, with only the operation being different, and thus the operation will be described referring to the reference numerals of the inkjet printing machine 1 of the first embodiment illustrated in FIGS. 1 to 3. Note that, although there will be described here, as an example, the inkjet heads 110 and 111 discharging black (K) ink, the same applies to the inkjet heads 112 and 113 discharging cyan (C) ink, the inkjet heads 114 and 115 discharging magenta (M) ink, and the inkjet heads 116 and 117 discharging yellow (Y) ink.

Figure 12A:
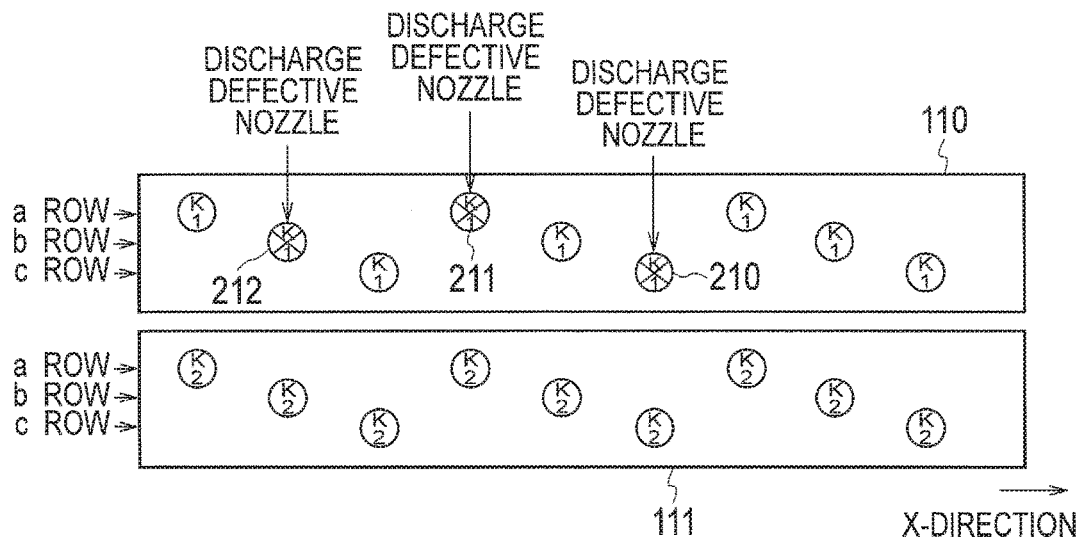
FIG. 12A illustrates positions of discharge defective nozzles of an inkjet head.
Figure 12B:
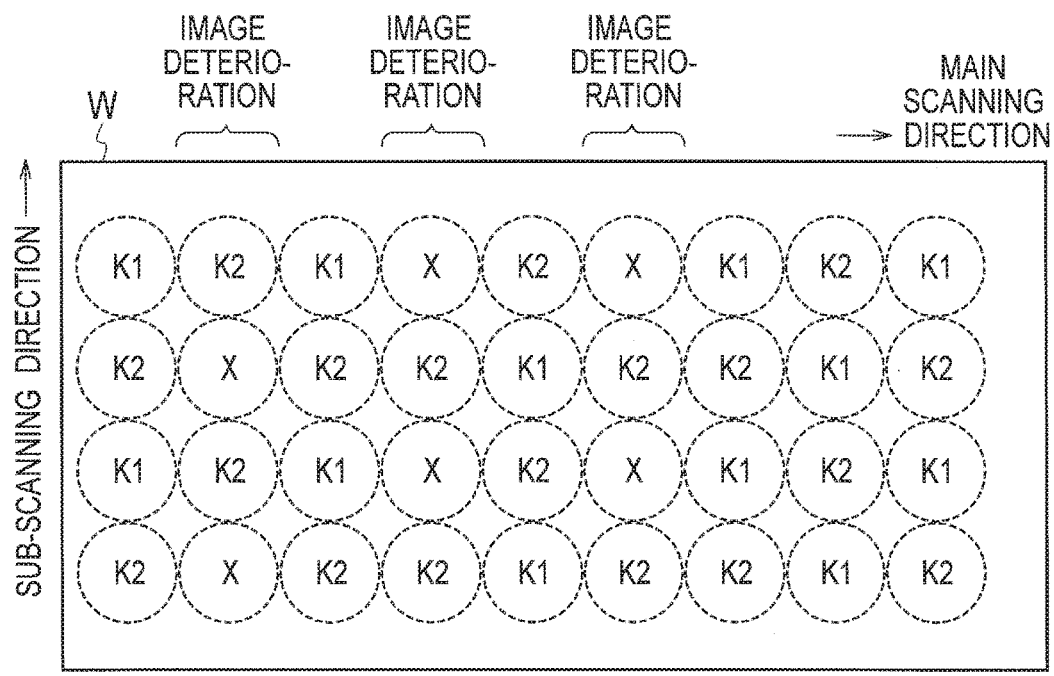
FIG. 12B illustrates landing positions of ink discharged from nozzles of the inkjet heads illustrated in FIG. 12A and pixels corresponding to discharge defective nozzles.

When viscosity of the ink rises, or contaminants included in the ink clog nozzles in the inkjet printing machine 1, such nozzles turn out to be discharge defective nozzles 210, 211 and 212, as illustrated in FIG. 12A, which cannot discharge the ink appropriately. In addition, existence of discharge defective nozzles 210, 211 and 212 results in appearance of a white stripe, as illustrated in FIG. 12B, without landing of ink on a position to be landed on the printing sheet W by being discharged, respectively, from the discharge defective nozzles 210, 211 and 212, thereby resulting in generation of image deterioration. A pixel at the position to be landed on the printing sheet W by being discharged from the discharge defective nozzles 210, 211 and 212 is referred to as a non-discharge pixel. In the example illustrated in FIG. 12B, the pixel indicated by "X" corresponds to a non-discharge pixel.

In addition, in the same way as the inkjet printing machine 1 of the first embodiment, when positional displacement of the inkjet head 111 relative to the inkjet head 110 of the same color as the inkjet head 111 is generated due to an installation error of the inkjet head or an impact on the machine during transportation, the inter-pixel distance t between neighboring pixels adjacent to a non-discharge pixel in the main scanning direction may be widened, narrowed, or remain unchanged.

Figure 13:
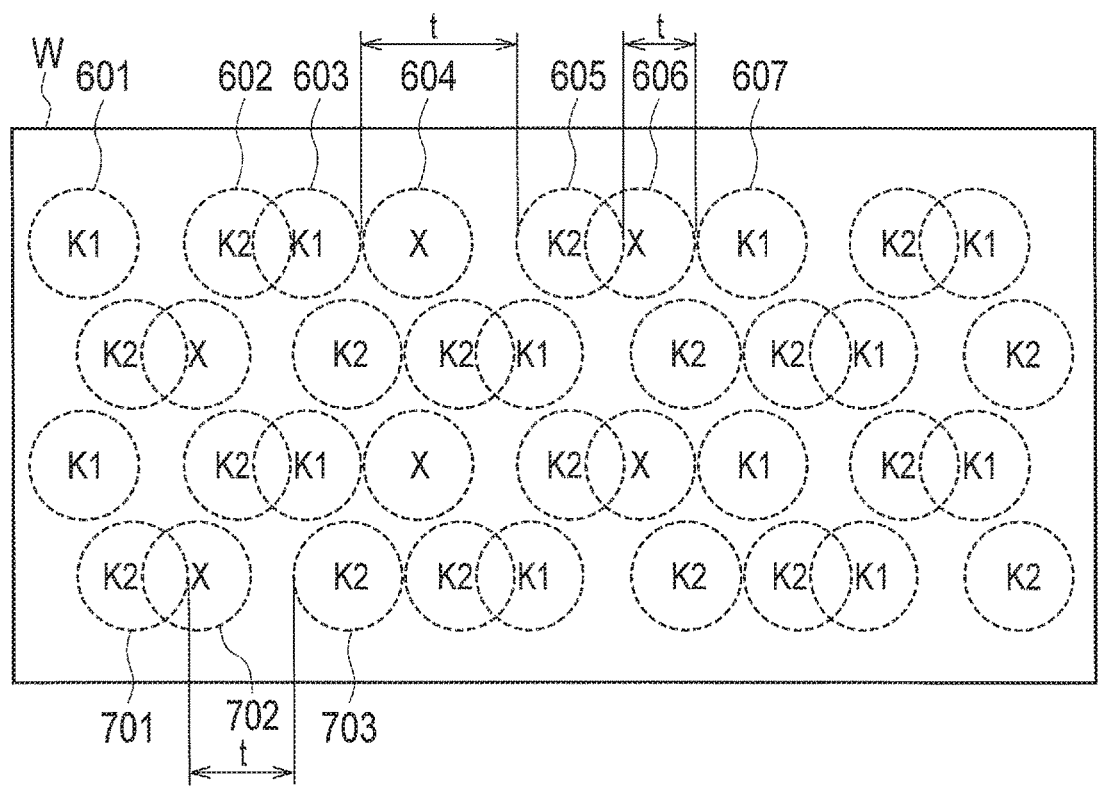
FIG. 13 is a diagram illustrating landing positions of ink discharged from nozzles of inkjet heads when positional displacement of an inkjet head relative to another inkjet head by "m" (mm) is generated in the X-direction.

FIG. 13 is a diagram illustrating landing positions of ink discharged from nozzles of the inkjet heads 110 and 111 when positional displacement of the inkjet head 111 relative to the inkjet head 110 by "m" (mm) is generated in the X-direction.

In the example illustrated in FIG. 13, the inter-pixel distance t between a neighboring pixel 603 and a neighboring pixel 605, adjacent to a non-discharge pixel 604 in the main scanning direction is widened. On the other hand, the inter-pixel distance t between a neighboring pixel 605 and a neighboring pixel 607, adjacent to a non-discharge pixel 606 in the main scanning direction is narrowed. In addition, the inter-pixel distance t between a neighboring pixel 701 and a neighboring pixel 703, adjacent to non-discharge pixel 702 in the main scanning direction and also discharged from the inkjet head 111 remain unchanged.

As illustrated in FIG. 12A, the inkjet heads 110 and 111, nozzles are arranged at regular intervals in the main scanning direction while being shifted to row a, row b and row c in the sub-scanning direction, for every three nozzles, and thus the inter-pixel distance t which is widened, narrowed, or remains unchanged is determined depending on which row the nozzle is provided.

When, for example, positional displacement of the inkjet head 111 relative to the inkjet head 110 by "m" (mm) is generated in the X-direction, that is, in the main scanning direction, the inter-pixel distance t between a pixel (for example, pixel 603) corresponding to a nozzle of row c of the inkjet head 110 and a pixel (for example, pixel 605) corresponding to a nozzle of row b of the inkjet head 111 is widened in accordance with the amount of displacement.

On the other hand, the inter-pixel distance t between a pixel (for example, pixel 605) corresponding to a nozzle of row b of the inkjet head 111 and a pixel (for example, pixel 607) corresponding to a nozzle of row a of the inkjet head 110 is narrowed in accordance with the amount of displacement.

In addition, the inter-pixel distance t between pixels (for example, pixels 701 and 703) corresponding to nozzles respectively provided on the same inkjet head, that is, the inkjet head 110 or 111 remains unchanged.

Therefore, the amount of displacement of the inkjet head 111 can be calculated according to the positions of pixels (for example, pixels 603 and 605) between which the inter-pixel distance t is widened, or pixels (for example, pixels 605 and 607) between which the inter-pixel distance t is narrowed.

The image processor 303 then determines, to be positive correction target pixels, the pixels between which the inter-pixel distance t exceeds the non-discharge pixel threshold value (predetermined distance). Assuming that the non-discharge pixel threshold value is, for example, "zero", the image processor 303 determines the neighboring pixels 603 and 605 to be positive correction target pixels in the example illustrated in FIG. 13.

On the other hand, the image processor 303 determines the pixels between which the inter-pixel distance t is smaller than the non-discharge pixel threshold value (predetermined distance) to be negative correction target pixels. In the example illustrated in, for example, FIG. 13, the image processor 303 determines the neighboring pixels 605 and 607 to be negative correction target pixels.

<Operation of Inkjet Printing Machine 1>

Next, the operation of the inkjet printing machine 1 according to the third embodiment of the present invention will be described.

<<Distance Calculation Processing>>

Figure 14:
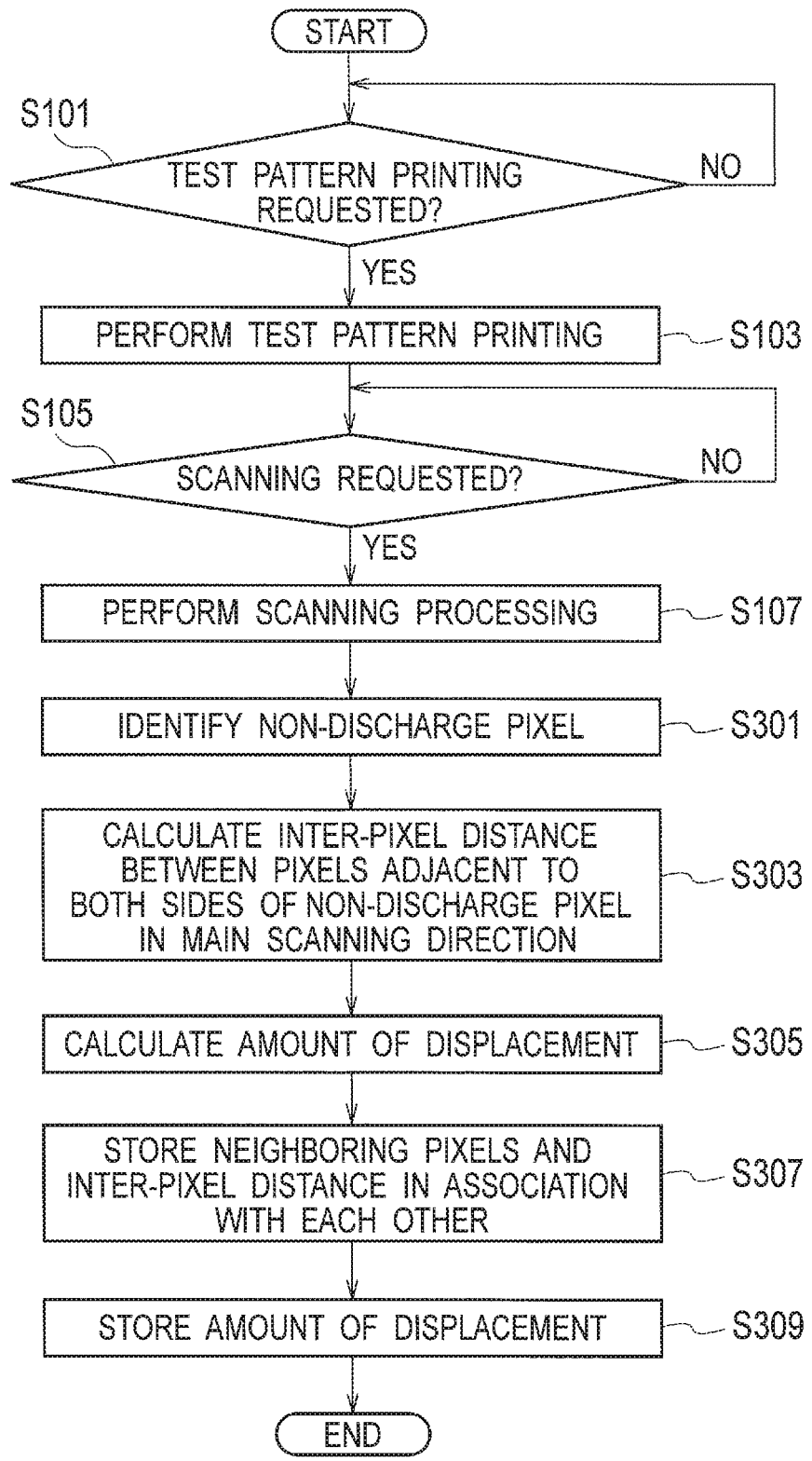
FIG. 14 is a flowchart illustrating a procedure of distance calculation processing of an inkjet printing machine according to a third embodiment of the present invention.

FIG. 14 is a flowchart illustrating a procedure of distance calculation processing of an inkjet printing machine 1 according to the third embodiment of the present invention. Processes at steps S101 to S107 of the flowchart are identical to the processes at steps S101 to S107 in the flowchart of the distance calculation processing performed by the inkjet printing machine 1 according to the first embodiment illustrated in FIG. 8, and thus explanation thereof is omitted.

When scanning processing is performed at step S107 as illustrated in FIG. 14, the read-in-test-pattern image data read by the scanner 313 is output to the distance calculator 308, and the distance calculator 308 identifies a non-discharge nozzle by comparing the test pattern image data with the entered read-in-test-pattern image data (step S301).

Next, the distance calculator 308 calculates the inter-pixel distance t between neighboring pixels adjacent to a non-discharge pixel in the main scanning direction (step S303), based on the entered read-in-test-pattern image data, and further calculates the amount of displacement between the inkjet head 110 and the inkjet head 111, in the main scanning direction (step S305).

Then, the correction-target-pixel determination unit 309 stores, in the correction-target-pixel storage unit 304, information indicating which pixels are neighboring pixels and the inter-pixel distance t between the neighboring pixels in association with each other, for each ink color (step S307).

Furthermore, the correction-target-pixel determination unit 309 stores the amount of displacement of inkjet heads in the correction-target-pixel storage unit 304, for each ink color (step S309).

<<Image Correction Processing>>

FIG. 15 is a flowchart illustrating a procedure of image correction processing of an inkjet printing machine 1 according to the third embodiment of the present invention. Processes at steps S201 to S203 of the flowchart are identical to the processes at steps S201 to S203 in the flowchart of the image correction processing performed by the inkjet printing machine 1 according to the first embodiment illustrated in FIG. 9, and thus explanation thereof is omitted.

As illustrated in FIG. 15, the image processor 303, upon generating drop data (step S203), determines whether or not a pixel of interest corresponds to a discharge defective nozzle (step S401).

When it is determined at step S401 that the pixel of interest does not correspond to a discharge defective nozzle (NO), image correction of the pixel of interest is not required, and thus the image processor 303 moves the process to step S415.

When, on the other hand, it is determined at step S401 that the pixel of interest corresponds to a discharge defective nozzle, in other words, the pixel is a non-discharge pixel, ("YES"), the image processor 303 extracts the inter-pixel distance t between neighboring pixels adjacent to the pixel of interest in the main scanning direction from the correction-target-pixel storage unit 304, and determines whether or not the extracted inter-pixel distance t exceeds the non-discharge pixel threshold value (step S407). A too large non-discharge pixel threshold value often leads to skipping correction, there remains possible density unevenness. On the other hand, a too small inter-pixel threshold value leads to correcting a pixel which is required not be corrected, there is a possibility of excessive amount of ink and increased blur. The inter-pixel threshold value must therefore be preliminarily set to an appropriate value. Here, the nozzle pitch in the main scanning direction is set as the non-discharge pixel threshold value.

When it is determined at step S407 that the inter-pixel distance t exceeds the non-discharge pixel threshold value (YES), the image processor 303 determines the neighboring pixels adjacent to both sides of the pixel of interest in the main scanning direction to be positive correction target pixels (step S409).

When, on the other hand, it is determined at step S407 that the inter-pixel distance t is equal to or smaller than the non-discharge pixel threshold value (NO), the image processor 303 determines whether or not the inter-pixel distance t is equal to the non-discharge pixel threshold value (step S411).

When it is determined that the inter-pixel distance t is equal to the non-discharge pixel threshold value ("YES" at step S411), the process proceeds to step S415 without performing any process, whereas when it is determined that the inter-pixel distance t is not equal to the non-discharge pixel threshold value ("NO" at step S411), since the inter-pixel distance t is smaller than the non-discharge pixel threshold value, the image processor 303 determines the neighboring pixels adjacent to both sides of the pixel of interest in the main scanning direction to be negative correction target pixels (step S413).

Then, the image processor 303 determines whether or not all the pixels have been evaluated (step S415). Accordingly, it is possible to determine, for all the pixels of image data, whether or not a pixel is a positive correction target pixel, a negative correction target pixel, or neither of them.

Next, the image processor 303 corrects the drop data, based on the positive correction target pixels and amount of displacement stored in the correction-target-pixel storage unit 304, so as to increase, in accordance with the amount of displacement, the number of drops to be discharged from nozzles corresponding to positive correction target pixels, and also corrects the drop data so as to decrease, in accordance with the amount of displacement, the number of drops to be discharged from nozzles corresponding to negative correction target pixels (step S417).

Specifically, the image processor 303 calculates, by using the following [Formula 3], the number of the drops $D_e$ after correction to be discharged from nozzles corresponding to positive correction target pixels. Here, the number of the drops before correction to be discharged from nozzles corresponding to positive correction target pixels is denoted as $D_b$, the number of drops of the pixel of interest (non-discharge pixel) is denoted as $D_0$, and the nozzle pitch between the inkjet head 110 and the inkjet head 111 in the main scanning direction of is denoted as P, and the amount of displacement of an inkjet head is denoted as m.

$$D_e = \frac{P+m}{P} \times \left(D_b + \frac{D_0}{2}\right)$$ [Formula 3]

In addition, the image processor 303 calculates, by using the following [Formula 4], the number of the drops $D_g$ after correction to be discharged from nozzles corresponding to negative correction target pixels. Here, the number of the drops before correction to be discharged from nozzles corresponding to negative correction target pixels is denoted as $D_d$.

$$D_g = \frac{P-m}{P} \times \left(D_d + \frac{D_0}{2}\right)$$ [Formula 4]

Then, since the pixel of interest is a non-discharge pixel, the image processor 303 sets the number of drops of the pixel of interest to "zero".

Accordingly, the print controller 305 can perform printing by discharging ink from the inkjet heads 110 to 117, based on the drop data corrected so as to increase, in accordance with the amount of displacement, the number of drops to be discharged from nozzles corresponding to positive correction target pixels. Therefore, even when there exists a non-discharge pixel and positional displacement is generated between the inkjet head 111 and the inkjet head 110, it is possible to narrow the inter-pixel distance between pixels whose inter-pixel distance is widened due to the positional displacement, among the neighboring pixels adjacent to the non-discharge pixel in the main scanning direction. Accordingly, it is possible to prevent occurrence of density unevenness in the printed image due to generation of a white stripe or the like caused by non-discharging. Furthermore, it is possible to widen the inter-pixel distance of the pixels whose inter-pixel distance is narrowed due to the positional displacement, among the neighboring pixels adjacent to the non-discharge pixel in the main scanning direction, making it possible to prevent overlapping of pixels or the like and to reduce bleeding.

As described above, in the inkjet printing machine 1 according to the third embodiment of the present invention, the distance calculator 308 determines a non-discharge nozzle based on the read-in test pattern image data (test image data) read from an original subjected to printing based on test pattern image data printed by discharging from a plurality of nozzles, and calculates the amount of displacement of an inkjet head having the determined non-discharge nozzle relative to an inkjet head of the same color in the main scanning direction, and the inter-pixel distance t between neighboring pixels adjacent to both sides of a pixel corresponding to the non-discharge nozzle in the main scanning direction, and the image processor 303 corrects the image data included in the received print job so as to increase, in accordance with the amount of displacement, the amount of ink to be discharged from nozzles corresponding to, among neighboring pixels, positive correction target pixels whose calculated inter-pixel distance exceeds the predetermined distance.

Accordingly, even when non-discharge from a nozzle is generated and also positional displacement of an inkjet head is generated in the main scanning direction, it is possible to perform an appropriate correction on neighboring pixels adjacent to both sides of a pixel corresponding to the non-discharge nozzle in the main scanning direction, in accordance with the amount of displacement of pixels in the main scanning direction, whereby the generation of density unevenness in the printed image can be prevented.

Note that there is a possibility that non-discharge pixels are generated in the main scanning direction with one pixel sandwiched therebetween. In such case, the pixel sandwiched between one of the non-discharge pixels and the other non-discharge pixel may satisfy either the condition for positive correction target pixels or negative correction target pixels. In such a case, the image processor 303 may preferentially set one of them in advance, or may determine positive correction target pixels or negative correction target pixels based on user operation.

Fourth Embodiment

In a fourth embodiment of the present invention, a description will be given, as an example, of the inkjet printing machine 1 in which inkjet heads are provided, respectively, in four rows along the main scanning direction, for each ink color. Note that the inkjet printing machine 1 of the fourth embodiment has the same configuration as the inkjet printing machine 1 of the first embodiment illustrated in FIGS. 1 and 3, with only the operation being different, and thus the operation will be described referring to the reference numerals of the inkjet printing machine 1 of the first embodiment illustrated in FIGS. 1 and 3.

Figure 16A:
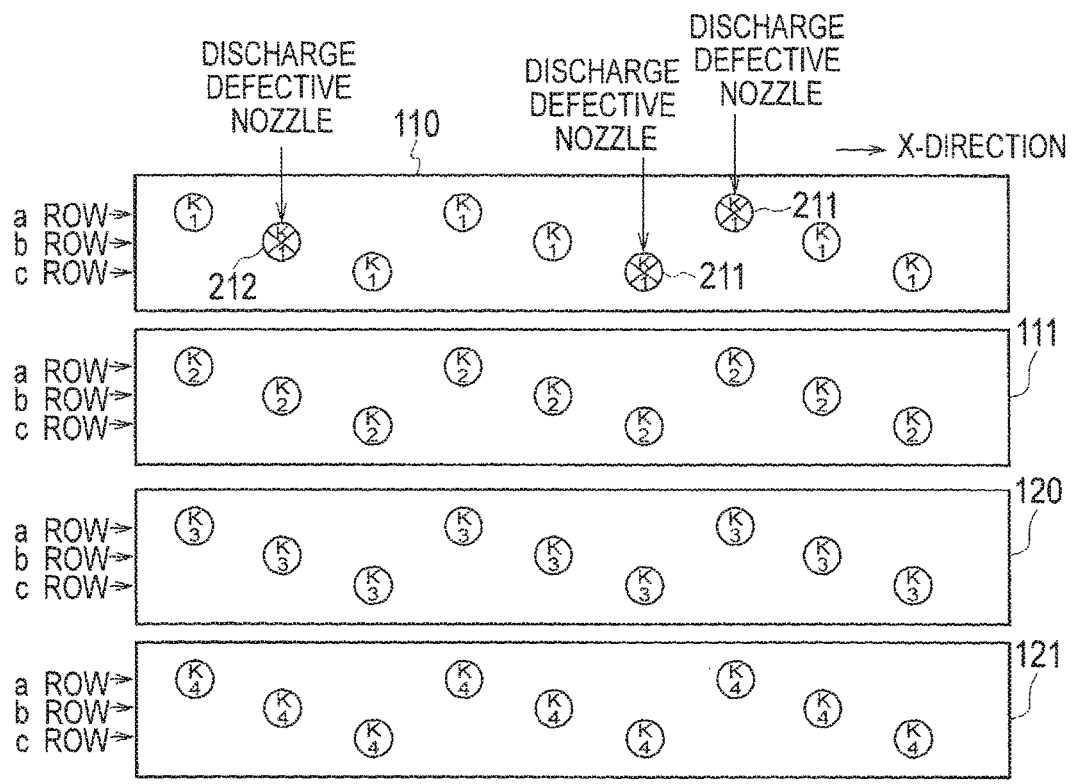
FIG. 16A illustrates positions of nozzles provided on respective inkjet heads.

FIG. 16A illustrates positions of nozzles provided on respective inkjet heads.

As illustrated in FIG. 16A, inkjet heads 120 and 121 configured to discharge black (K) ink are provided in addition to the inkjet heads 110 and 111 configured to discharge black (K) ink as illustrated in FIG. 4A. Note that, although not explained in detail here, inkjet heads for colors of cyan (C), magenta (M), yellow (Y) are similarly provided in four rows, respectively.

Figure 16B:
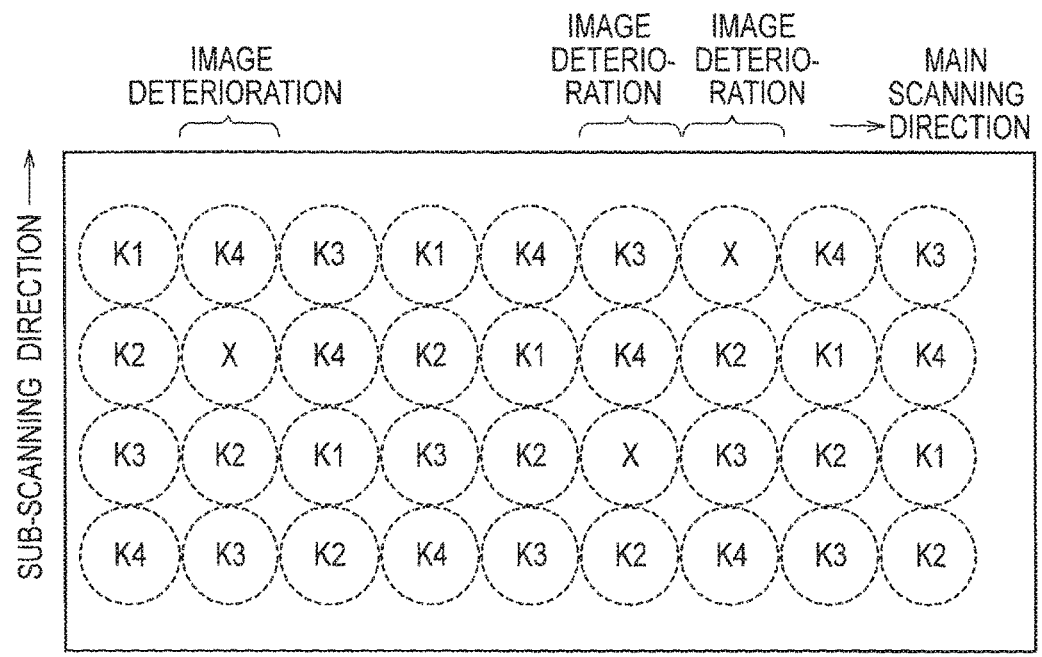
FIG. 16B is a diagram illustrating landing positions of ink discharged from nozzles of the inkjet heads illustrated in FIG. 16A.

FIG. 16B illustrates landing positions of ink discharged from nozzles of the inkjet heads 110, 111, 120 and 121 illustrated in FIG. 16A. Note that, although a description will be given here, as an example, of the inkjet heads 110, 111, 120 and 121 configured to discharge black (K) ink, the same applies to cyan (C), magenta (M), and yellow (Y), and thus explanation thereof is omitted.

As illustrated in FIG. 16A, nozzles are arranged on the inkjet head 110 at a regular interval in the main scanning direction, while every three nozzles are shifted from each other in the sub-scanning direction.

Then, as illustrated in FIG. 16B, landing positions (denoted as "K1") of ink discharged from the inkjet head 110, landing positions (denoted as "K2") of ink discharged from the inkjet head 111, landing positions (denoted as "K3") of ink discharged from the inkjet head 120, and landing positions (denoted as "K4") of ink discharged from the inkjet head 121 are controlled so as to be landed in the sub-scanning direction.

Accordingly, ink discharged from the inkjet heads 110, 111, 120 and 121 is landed in alignment without any space therebetween both in the main scanning direction and the sub-scanning direction, thereby forming pixels having a uniform density. In the example illustrated in FIG. 16B, the pixels discharged from the inkjet heads 110, 111, 120 and 121 and landed adjacent to each other in the main scanning direction come into contact with each other, and thus the inter-pixel distance s is all "zero".

However, when viscosity of the ink rises, or contaminants included in the ink clog nozzles in the inkjet printing machine 1, such nozzles turn out to be discharge defective nozzles 210, 211 and 212, as illustrated in FIG. 16A, which cannot discharge the ink appropriately. In addition, existence of discharge defective nozzles 210, 211 and 212 results in appearance of a white stripe, as illustrated in FIG. 16B, without landing of ink on a position to be landed on the printing sheet W by being discharged, respectively, from the discharge defective nozzles 210, 211 and 212, thereby resulting in generation of image deterioration. The non-discharge pixel at the position to be landed on the printing sheet W by being discharged from the discharge defective nozzles 210, 211 and 212 corresponds to the pixel indicated by "X", in the example illustrated in FIG. 16B.

Furthermore, similarly to the inkjet printing machine 1 of the first embodiment, when positional displacement of the inkjet head relative to the inkjet head of the same color as the inkjet head is generated due to an installation error of the inkjet head, an impact on the machine during transportation, or the like, the inter-pixel distance t between neighboring pixels adjacent to a non-discharge pixel in the main scanning direction may be widened, narrowed, or remain unchanged.

Figure 17:
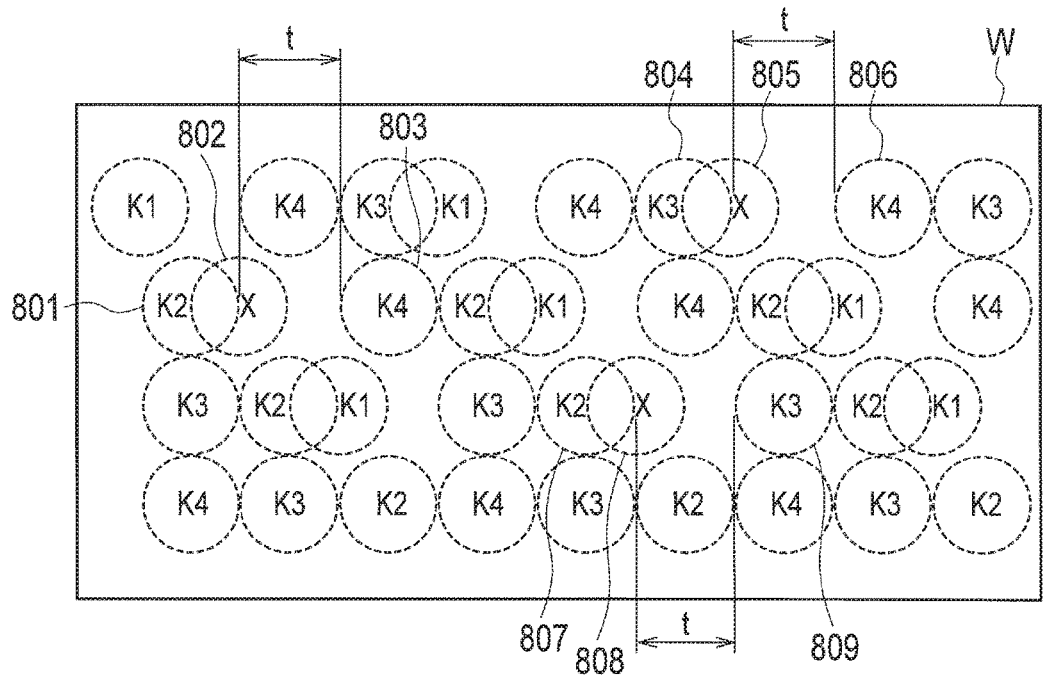
FIG. 17 is a diagram illustrating landing positions of ink discharged from nozzles of inkjet heads when positional displacement of inkjet heads relative to another inkjet head by "m" (mm) is generated in the X-direction illustrated in FIG. 16A.

FIG. 17 illustrates landing positions of ink discharged from nozzles of the inkjet heads 110, 111, 120 and 121 when positional displacement of the inkjet heads 111, 120 and 121 relative to the inkjet head 110 by "m" (mm) is generated in the X-direction illustrated in FIG. 16A.

In the example illustrated in FIG. 17, even when positional displacement is generated, the inter-pixel distance t between a neighboring pixel 801 discharged from the inkjet head 111 and a neighboring pixel 803 discharged from the inkjet head 121 together being adjacent to a non-discharge pixel 802 in the main scanning direction remains unchanged. Similarly, the inter-pixel distance t between a neighboring pixel 804 discharged from inkjet head 120 and a neighboring pixel 806 discharged from the inkjet head 121 together being adjacent to a non-discharge pixel 805 in the main scanning direction remains unchanged, and also the inter-pixel distance t between a neighboring pixel 807 discharged from the inkjet head 111 and a neighboring pixel 809 discharged from the inkjet head 120 together being adjacent to a non-discharge pixel 808 in the main scanning direction remains unchanged.

In this case, the image processor 303 determines, for all the pixels in the image data, that neither a pixel subject to positive correction nor a pixel subject to negative correction exits and, with the image data uncorrected, the print controller 305 executes printing by discharging ink from the inkjet heads 110, 111, 120 and 121 based on the uncorrected image data (drop data).

Figure 18:
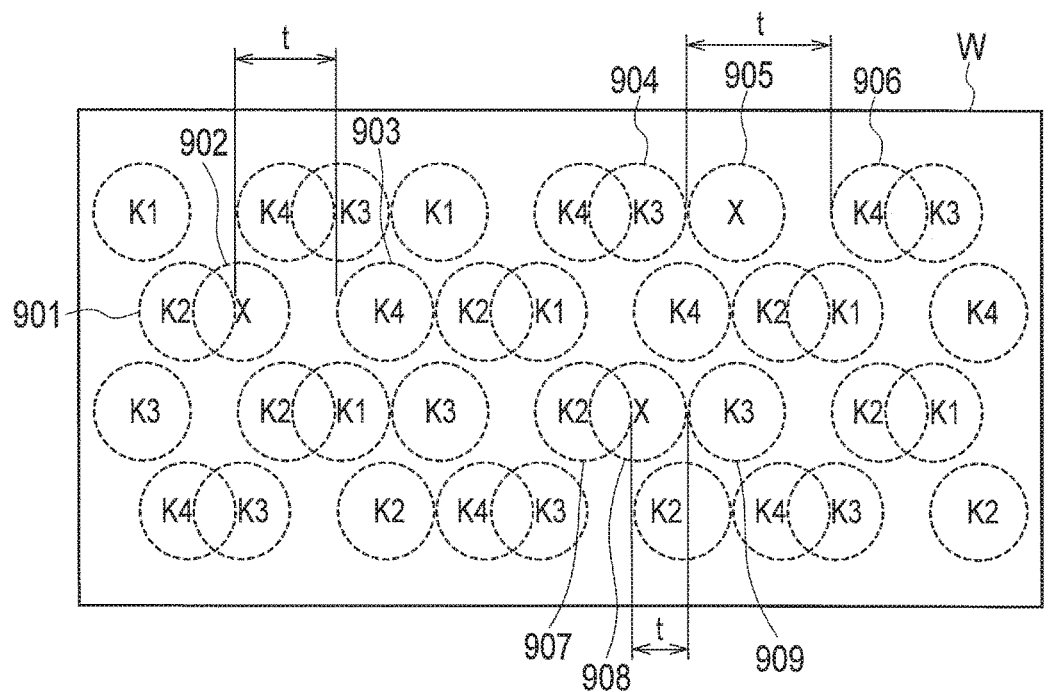
FIG. 18 is a diagram illustrating landing positions of ink discharged from nozzles of inkjet heads when positional displacement of inkjet heads relative to other inkjet heads by "m" (mm) is generated in the X-direction illustrated in FIG. 16A.

FIG. 18 is a diagram illustrating landing positions of ink discharged from nozzles of the inkjet heads 110, 111, 120 and 121 when positional displacement of the inkjet heads 111 and 121 relative to the inkjet heads 110 and 120 by "m" (mm) is generated in the X-direction illustrated in FIG. 16A.

In the example illustrated in FIG. 18, the inter-pixel distance t between a neighboring pixel 904 adjacent to a non-discharge pixel 905 in the main scanning direction and a neighboring pixel 906 is widened. On the other hand, the inter-pixel distance t between a neighboring pixel 907 adjacent to a non-discharge pixel 908 in the main scanning direction and a neighboring pixel 909 is narrowed. In addition, the inter-pixel distance t between a neighboring pixel 901 and a neighboring pixel 903, adjacent to a non-discharge pixel 902 in the main scanning direction remains unchanged.

As illustrated in FIG. 16A, in the inkjet heads 110, 111, 120 and 121, nozzles are arranged at regular intervals in the main scanning direction while being shifted to row a, row b and row c in the sub-scanning direction, for every three nozzles, and thus the inter-pixel distance t which is widened, narrowed, or remains unchanged is determined depending on which row the nozzle is provided.

When, for example, positional displacement of the inkjet heads 111 and 121 relative to the inkjet heads 110 and 120 by "m" (mm) is generated in the X-direction illustrated in FIG. 16A, the inter-pixel distance t between a pixel (for example, pixel 904) corresponding to a nozzle of row c of the non-displaced inkjet head 120 and a pixel (for example, pixel 906) corresponding to a nozzle of row b of the displaced inkjet head 121 is widened in accordance with the amount of displacement.

On the other hand, the inter-pixel distance t between a pixel (for example, pixel 907) corresponding to a nozzle of row b of the displaced inkjet head 111 and a pixel (for example, pixel 909) corresponding to a nozzle of row a of the non-displaced inkjet head 120 is narrowed in accordance with the amount of displacement.

In addition, the inter-pixel distance t between a pixel (for example, pixel 901) corresponding to a nozzle of row a of the displaced inkjet head 111 and a pixel (for example, pixel 903) corresponding to a nozzle of row c of the displaced inkjet head 120 is narrowed in accordance with the amount of displacement.

Accordingly, the amount of displacement of the inkjet heads 111 and 121 can be calculated according to the positions of pixels (for example, pixel 904 and pixel 906) between which the inter-pixel distance t is widened, or pixels (for example, pixel 907 and pixel 909) between which the inter-pixel distance t is narrowed.

The image processor 303 then determines the pixels between which the inter-pixel distance t exceeds a predetermined distance to be positive correction target pixels. For example, in the example illustrated in FIG. 18, the image processor 303 determines the neighboring pixel 904 and the neighboring pixel 906 to be positive correction target pixels.

On the other hand, the image processor 303 determines the pixels between which the inter-pixel distance t is smaller than the predetermined distance to be negative correction target pixels. For example, in the example illustrated in FIG.

18, the image processor 303 determines the neighboring pixel 907 and the neighboring pixel 909 to be negative correction target pixels.

Accordingly, in a configuration including inkjet heads arranged respectively in four rows color along the main scanning direction for each ink color, as with the inkjet printing machine 1 of the fourth embodiment of the present invention, even when non-discharge from a nozzle is generated and also positional displacement of an inkjet head is generated in the main scanning direction, it is possible to perform an appropriate correction on neighboring pixels adjacent to both sides of a pixel corresponding to the non-discharge nozzle in the main scanning direction, in accordance with the amount of displacement of pixels in the main scanning direction, whereby the generation of density unevenness in the printed image can be prevented.

Note that, although in the fourth embodiment of the present invention, there has been described, as an example, the inkjet printing machine 1 including inkjet heads arranged respectively in four rows along the main scanning direction for each ink color, the number of rows is not limited to four and there may be provided any number of rows of inkjet heads as long as the number is plural.

The present invention is not limited to the above-mentioned embodiments as they are and constituent elements can be modified and embodied within a range not deviating from the gist thereof in the implementation phase. In addition, it is possible to form various inventions by appropriately combining together the plurality of constituent elements disclosed in the above-mentioned embodiment. For example, some constituent elements may be deleted from all of the constituent elements described above.

In addition, for example, each of the functions and the processing described above can be implemented by one or more processing circuits. The processing circuits include a programmed processor, an electric circuit and the like and further include devices such as an integration circuit (ASIC) for specific application, circuit constituent elements arranged so as to execute the described functions, and the like.

The present application claims the priority based on Japanese Patent Application No. 2015-071371 filed on Mar. 31, 2015 and the entire content of the present patent application is incorporated herein by reference.

INDUSTRIAL APPLICABILITY

According to the inkjet printing machine pertaining to the present invention, even when positional displacement of an inkjet head is generated, it is possible to increase the amount of ink and thus to narrow the inter-pixel distance, with respect to pixels having the inter-pixel distance widened due to the positional displacement. Accordingly, it becomes possible to make an appropriate correction in accordance with the amount of displacement of pixels in the main scanning direction, whereby the generation of density unevenness in the printed image can be prevented.

REFERENCE SIGNS LIST 1 inkjet printing machine
10 side paper feed unit
11 paper feed tray
12 primary paper feed unit
14 secondary paper feed unit
20 internal paper feed unit
30 printing unit
31 inkjet head unit
32 transfer unit
40 paper discharge unit
50 reversing unit
100 controller
110 to 117, 120, 121 inkjet head
131, 132 suction fan
133 transfer belt
301 print job receiver
302 print job storage unit
303 image processor
304 correction-target-pixel storage unit
305 print controller
306 operation signal acquisition unit
307 read-in image acquisition unit
308 distance calculator
309 correction-target-pixel determination unit
311 communication interface
312 operation panel
313 scanner

What is claimed is:

1. An inkjet printing machine comprising:
an inkjet head unit having, along a main scanning direction, inkjet heads of a same color provided in a plurality of rows in a sub-scanning direction, the inkjet head unit being configured to discharge ink, on a sheet transferred in the sub-scanning direction, sequentially in the sub-scanning direction from nozzles of the inkjet heads arranged in the plurality of rows;
a distance calculator configured to calculate, based on test image data read from a sheet subjected to test printing by discharge from nozzles, an amount of displacement between inkjet heads of the same color in the main scanning direction, and calculate an inter-pixel distance between pixels adjacent in the main scanning direction; and
an image processor configured to correct image data included in a received print job so as to increase, in accordance with the amount of displacement, an amount of ink to be discharged from nozzles corresponding to positive correction target pixels whose calculated inter-pixel distance exceeds a predetermined distance.

2. The inkjet printing machine according to claim 1, wherein
the image processor further corrects the image data so as to decrease, in accordance with the amount of displacement, an amount of ink to be discharged from nozzles corresponding to negative correction target pixels, which are pixels other than the positive correction target pixels.

3. An inkjet printing machine comprising:
an inkjet head unit having, along a main scanning direction, inkjet heads of a same color provided in a plurality of rows in a sub-scanning direction, the inkjet head unit being configured to discharge ink, on a sheet transferred in the sub-scanning direction, sequentially in the sub-scanning direction from nozzles of the inkjet heads arranged in the plurality of rows;
a distance calculator configured to determine a non-discharge nozzle based on test image data read from a sheet subjected to test printing by discharge from nozzles, and to calculate an amount of displacement in the main scanning direction of an inkjet head having the determined non-discharge nozzle relative to an inkjet head of the same color, and an inter-pixel distance between neighboring pixels adjacent to both sides of a pixel corresponding to the non-discharge nozzle in the main scanning direction; and an image processor configured to correct image data included in a received print job so as to increase, in accordance with the amount of displacement, an amount of ink to be discharged from nozzles corresponding to, among the neighboring pixels, positive correction target pixels for the calculated inter-pixel distance which exceeds a predetermined distance.

* * * * *